United States Patent
Lee et al.

(10) Patent No.: US 10,310,817 B2
(45) Date of Patent: Jun. 4, 2019

(54) APPARATUS AND METHOD FOR MODULAR MULTIPLICATION

(71) Applicant: ELECTRONICS AND TELECOMMUNICATIONS RESEARCH INSTITUTE, Daejeon (KR)

(72) Inventors: Yun-Koo Lee, Daejeon (KR);
Dong-Geon Lee, Daejeon (KR);
Min-Kyu Joo, Gumi-si (KR);
Yoen-Cheol Lee, Daejeon (KR);
Sang-Woon Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 75 days.

(21) Appl. No.: 15/807,888

(22) Filed: Nov. 9, 2017

(65) Prior Publication Data

US 2018/0181374 A1 Jun. 28, 2018

(30) Foreign Application Priority Data

Dec. 23, 2016 (KR) .................. 10-2016-0177379

(51) Int. Cl.
*G06F 7/72* (2006.01)
*G06F 7/523* (2006.01)
*G06F 7/50* (2006.01)

(52) U.S. Cl.
CPC ............. *G06F 7/523* (2013.01); *G06F 7/50* (2013.01); *G06F 7/722* (2013.01); *G06F 7/728* (2013.01)

(58) Field of Classification Search
CPC .................... G06F 7/722; G06F 7/728
See application file for complete search history.

(56) References Cited

U.S. PATENT DOCUMENTS

| 2004/0125948 A1* | 7/2004 | Son ........................ G06F 7/728 380/28 |
| 2005/0267926 A1* | 12/2005 | Al-Khoraidly ......... G06F 7/724 708/492 |
| 2018/0097625 A1* | 4/2018 | Satpathy ................. H04L 9/302 |

FOREIGN PATENT DOCUMENTS

| KR | 10-0438456 B1 | 7/2004 |
| KR | 10-2010-0063623 A | 6/2010 |
| KR | 10-2015-0112059 A | 10/2015 |

OTHER PUBLICATIONS

Holger Orup, "Simplifying Quotient Determination in High-Radix Modular Multiplication," Proceedings of the 12th Symposium on Computer Arithmetic, p. 193, Jul. 19-21, 1995.
(Continued)

*Primary Examiner* — Chuong D Ngo
(74) *Attorney, Agent, or Firm* — LRK Patent Law Firm

(57) ABSTRACT

An apparatus and method for modular multiplication. The modular multiplication apparatus includes a first operation unit for performing a first operation based on a structure of at least one of a serial multiplier and a serial squarer-based multiplier; a second operation unit for performing a second operation based on a structure of at least one of the serial multiplier and the serial squarer-based multiplier; an adder unit for outputting the sum of results of the first operation and the second operation, inputting an intermediate value stream to the first input unit, which calculates the product of the intermediate value stream and a zeta parameter, and outputting a High-Order Term as a result of Montgomery Modular Multiplication, wherein the first and second operation units output a result in digit-serial format in order from the least significant digit to the most significant digit.

12 Claims, 27 Drawing Sheets

(56) References Cited

OTHER PUBLICATIONS

S.B. Ors et al., "Hardware implementation of a Montgomery modular multiplier in a systolic array," The 10th Reconfigurable Architectures Workshop (RAW), Nice, France, Apr. 22, 2003.

* cited by examiner

| Previous Algorithm | (prev.) MMM$_{HW1}$ for HW |
|---|---|

Require: $A=[a_{n+d} \cdots a_n, a_{n-1} \cdots a_0]$, $B=[b_{n-1} \cdots b_0]$, $-M'M \bmod 2^{k(d+1)}=1$, $M''=M' \bmod 2^{k(d+1)}$, $s_0=0$ Result: $MMM_{HW1}(A, B, M) =_{SAP} 2^{kd} s_{n+d+1} + [q_{n=d} \cdots q_{n+1}] \equiv (2^{kn})^{-1} \cdot AB \pmod{M}$, '$=_{SAP}$' means that result is from Sequential Algorithmic Process Recurrent equation:
$$S_{i+1} = \frac{S_i}{2^k} + \frac{q_i \cdot d^{M''M}}{2^{k(d+1)}} + a_i B + \frac{q_i \cdot d - q_i 2^{kd}}{2^{k(d+1)}} \quad (1)$$

$$= \frac{S_i}{2^k} + q_{i-d} \frac{M''M+1}{2^{k(d+1)}} + a_i B - \frac{q_i}{2^k}$$

$$= \frac{S_i}{2^k} + q_{i-d} \zeta + a_i B - \frac{q_i}{2^k} \quad (2)$$

where $q_i = s_i \bmod 2^k$

Invariant:
$$S_{i+1} = \frac{M''M[q_{i-d} \cdots q_{-d}] + [a_i \cdots a_0] B 2^{k(d+1)} - [q_i \cdots q_{i-d+1}] 2^{k(i+1)}}{2^{k(d+i+1)}}$$

$$\equiv (2^{ki})^{-1} \cdot [a_i \cdots a_0] B$$
$$\quad -(2^{kd})^{-1} \cdot [q_i \cdots q_{i-d+1}] \pmod{M} \quad (3)$$

$\approx [a_i \cdots a_0] B \pmod{M}$ after post-processing and MMM

FIG. 3

| Algorithm 1 | (proposed) $MMM_{HW5}$ for HW |
|---|---|

Require: $A=[a_{n+d} \cdots a_n, a_{n-1} \cdots a_0]$, $B=[b_{n+d} \cdots b_n, b_{n-1} \cdots b_0]$, $-M'M$ mod $2^{k(d+1)}=1$, $M''=M' \bmod 2^{k(d+1)}$, $\zeta = \dfrac{M''M+1}{2^{k(d+1)}} = [\zeta_{n+d} \cdots \zeta_i, \zeta_{i-1} \cdots \zeta_0]$ $=[0 \ldots 0, \zeta_{i-1} \ldots \zeta_0]$, $l=|M|$ where $|\ |$ means bit size, $$s_0=0$$

Result: $MMM_{HW2}(A, B, M) =_{os} 2^{kd}s_{n+d+1}+[q_{n+d}\cdots q_{n+1}] \equiv (2^{kn})^{-1} \cdot AB \pmod{M}$, '$=_{os}$' means that result comes out as Output Stream of any radix Recurrent equation:

$$s_{i+1} = \frac{s_i}{2^k} + (Q\zeta)ps_i + (AB)ps_i - \frac{q_i}{2^k} \quad (4)$$

where $q_i = s_i \bmod 2^k$, $(Q\zeta)ps_i$ is $\exists$ value which meets '$\Sigma (Q\zeta)ps_i = Q\zeta$' and $[(Q\zeta)ps_i(Q\zeta)ps_{i-1}\cdots(Q\zeta)ps_0]$ includes $i$-th column in PPs of $Q\zeta$, $(AB)ps_i$ is $\exists$ value which meets '$\Sigma (AB)ps_i = AB$' and $[(AB)ps_i(AB)ps_{i-1}\cdots(AB)ps_0]$ includes $i$-th column in PPs of $AB$ Invariant:

$$s_{i+1} = \frac{[(Q\zeta)ps_i(Q\zeta)ps_{i-1}\cdots(Q\zeta)ps_0]}{2^{ki}}$$
$$+ \frac{[(AB)ps_i(AB)ps_{i-1}\cdots(AB)ps_0]-[q_iq_{i-1}\cdots q_1]}{2^{ki}} \quad (5)$$

-> Annihilation of $q_j$ is not possible to some point so $[q_iq_{i-1}\cdots q_1]$'s index value '$i$' is increasing with iteration above

FIG. 5

| Algorithm 2 | (proposed) MMM$_{HW3}$ for HW |
|---|---|

Require: $A=[a_{n+d} \cdots a_n, a_{n-1} \cdots a_0]$, $B=[b_{n+d} \cdots b_n, b_{n-1} \cdots b_0]$, $-M'M$ mod $2^{k(d+1)}=1$, $M''=M' \bmod 2^{k(d+1)}$, $\zeta = \dfrac{M''M+1}{2^{k(d+1)}} = [\zeta_{n+d} \cdots \zeta_i, \zeta_{i-1} \cdots \zeta_0]$
$=[0 \ldots 0, \zeta_{i-1} \ldots \zeta_0]$, $l=|M|$ where $|\ |$ means bit size,
$$s_0=0$$
Result: $MMM_{HW2}(A, B, M) =_{os} 2^{kd}s_{n+d+1} + [q_{n+d} \cdots q_{n+1}] \equiv (2^{kn})^{-1} \cdot AB \pmod{M}$,
'$=_{os}$' means that result comes out as Output Stream of any radix Recurrent equation:
$$s_{i+1} = \frac{s_i}{2^k} + (Q\zeta)_{RPE(q_{i-d\_in})} + ([(a+b)^2]_i - [(a-b)^2]_i) \gg 2 - \frac{q_i}{2^k}$$
$$= \frac{s_i}{2^k} + (Q\zeta)_{\angle i} + (AB)_{\angle i} - \frac{q_i}{2^k} \quad (6)$$

where $q_i = s_i \bmod 2^k$, $(Q\zeta)_{\angle i}$ is sum of elements in $i$-th RPE with that $s_{i+1}$ includes $i$-th column in PPs of $Q\zeta$, $[(a+b)^2]_i$ is $\exists PPS$ in $(a+b)^2$ with that $s_{i+1}$ includes $i$-th column in PPs of $(a+b)^2$, $[(a-b)^2]_i$ is $\exists PPS$ in $(a-b)^2$ with that $s_{i+1}$ includes $i$-th column in PPs of $(a-b)^2$ (7)

Invariant:
$$s_{i+1} = \frac{[(Q\zeta)_{\angle i} (Q\zeta)_{\angle i-1} \cdots (Q\zeta)_{\angle 0}]}{2^{ki}}$$
$$+ \frac{[(AB)_{\angle i}(AB)_{\angle i-1} \cdots (AB)_{\angle 0}] - [q_i q_{i-1} \cdots q_1]}{2^{ki}} \quad (8)$$

where $(Q\zeta)_{\angle j} = (Q\zeta)_{RPE(q_{j-d\_in})}$ , $(AB)_{\angle j} = ([(a+b)^2]_j - [(a-b)^2]_j) \gg 2$, $0 \le j \le i$ -> Annihilation of $q_j$ is not possible to some point so $[q_i q_{i-1} \cdots q_1]$'s index value '$i$' is increasing with iteration above

FIG. 6

| Algorithm 3 | (proposed) $MMM_{HW2}$ for HW |
|---|---|

Require: $A=[a_{n+d} \cdots a_n, a_{n-1} \cdots a_0]$, $B=[b_{n+d} \cdots b_n, b_{n-1} \cdots b_0]$, $-M'M$ mod $2^{k(d+1)}=1$, $M''=M' \bmod 2^{k(d+1)}$, $\zeta = \dfrac{M''M+1}{2^{k(d+1)}} = [\zeta_{n+d} \cdots \zeta_l, \zeta_{l-1} \cdots \zeta_0]$
$=[0 \ldots 0, \zeta_{l-1} \ldots \zeta_0]$, $l=|M|$ where $|\ |$ means bit size,
$$s_0 = 0$$
Result: $MMM_{HW2}(A, B, M) =_{os} 2^{kd} s_{n+d+1} + [q_{n+d} \cdots q_{n+1}] \equiv (2^{kn})^{-1} \cdot AB \pmod{M}$,
'$=_{os}$' means that result comes out as Output Stream of any radix Recurrent equation:
$$s_{i+1} = \frac{s_i}{2^k} + (Q\zeta)_{RPE(q_{i-d\_in})} + (AB)_{RPE(a_i\_in)} - \frac{q_i}{2^k}$$
$$= \frac{s_i}{2^k} + (Q\zeta)\llcorner_i + (AB)\llcorner_i - \frac{q_i}{2^k} \qquad (9)$$

where $q_i = s_i \bmod 2^k$, $(Q\zeta)\llcorner_i$ is sum of elements in $i$-th RPE  (10)
with that $s_{i+1}$ includes $i$-th column in PPs of $Q\zeta$, $(AB)\llcorner_i$ is
sum of elements in $i$-th RPE with that $s_{i+1}$ includes $i$-th column
in PPs of AB Invariant:
$$s_{i+1} = \frac{[(Q\zeta)\llcorner_i (Q\zeta)\llcorner_{i-1} \cdots (Q\zeta)\llcorner_0]}{2^{ki}}$$
$$+ \frac{[(AB)\llcorner_i (AB)\llcorner_{i-1} \cdots (AB)\llcorner_0] - [q_i q_{i-1} \cdots q_1]}{2^{ki}} \qquad (11)$$

where $(Q\zeta)\llcorner_j = (Q\zeta)_{RPE(q_{j-d\_in})}$,
$\quad (AB)\llcorner_j = (AB)_{RPE(a_j\_in)}$, $0 \le j \le i$
->Annihilation of $q_j$ is not possible to some point so
$[q_i q_{i-1} \cdots q_1]$'s index value '$i$' is increasing with iteration above

FIG. 11

| Algorithm 4 | (proposed) $MMM_{HW4}$ for HW |
|---|---|

Require: $A=[a_{n+d} \cdots a_n, a_{n-1} \cdots a_0]$, $B=[b_{n+d} \cdots b_n, b_{n-1} \cdots b_0]$, $-M'M$ mod $2^{k(d+1)}=1$, $M''=M' \bmod 2^{k(d+1)}$, $\zeta = \frac{M''M+1}{2^{k(d+1)}} = [\zeta_{n+d} \cdots \zeta_i, \zeta_{i-1} \cdots \zeta_0]$
$= [0 \ldots 0, \zeta_{i-1} \ldots \zeta_0]$, $l=|M|$ where $|\ |$ means bit size,
$s_0 = 0$ Result: $MMM_{HW2}(A, B, M) =_{os} 2^{kd}s_{n+d+1} + [q_{n+d} \cdots q_{n+1}] \equiv (2^{kn})^{-1} \cdot AB \pmod{M}$,
'$=_{os}$' means that result comes out as Output Stream of any radix Recurrent equation:

$$s_{i+1} = \frac{s_i}{2^k} + ([(Q+\zeta)^2]_i - [(Q+\zeta)^2]_i) \gg 2 + ([(a+b)^2]_i - [(a-b)^2]_i) \gg 2 - \frac{q_i}{2^k} \quad (12)$$

$$= \frac{s_i}{2^k} + (Q\zeta)\angle_i + (AB)\angle_i - \frac{q_i}{2^k} \quad (13)$$

where $q_i = s_i \bmod 2^k$, $[(Q+\zeta)^2]_i$ is $\exists PPS$ in $(Q+\zeta)^2$ with that $s_{i+1}$ includes $i$-th column in PPs of $(Q+\zeta)^2$, $[(Q-\zeta)^2]_i$ is $\exists PPS$ in $(Q-\zeta)^2$ with that $s_{i+1}$ includes $i$-th column in PPs of $(Q-\zeta)^2$, $[(a+b)^2]_i$ is $\exists PPS$ in $(a+b)^2$ with that $s_{i+1}$ includes $i$-th column in PPs of $(a+b)^2$, $[(a-b)^2]_i$ is $\exists PPS$ in $(a-b)^2$ with that $s_{i+1}$ Includes $i$-th column in PPs of $(a-b)^2$ Invariant:

$$S_{i+1} = \frac{[(Q\zeta)\angle_i (Q\zeta)\angle_{i-1} \cdots (Q\zeta)\angle_0]}{2^{ki}}$$

$$+ \frac{[(AB)\angle_i (AB)\angle_{i-1} \cdots (AB)\angle_0] - [q_i q_{i-1} \cdots q_1]}{2^{ki}} \quad (11)$$

where $(Q\zeta)\angle_j = ([(q+\zeta)^2]_j - [(q+\zeta)^2]_j) \gg 2$,
$(AB)\angle_j = ([(a+b)^2]_j - [(a-b)^2]_j) \gg 2$, $0 \le j \le i$ →Annihilation of $q_j$ is not possible to some point so $[q_i q_{i-1} \cdots q_1]$'s index value '$i$' is increasing with iteration above

FIG. 14

In '00', first '0' means $\zeta_0$'s index 0

| | | | | | 5 | 4 | 3 | 2 | 1 | 0 |
|---|---|---|---|---|---|---|---|---|---|---|
| | | | | | 5 | 4 | 3 | 2 | 1 | 0 |
| | | | | | 50 | 40 | 30 | 20 | 10 | 00 |
| | | | | 51 | 41 | 31 | 21 | 11 | 01 | |
| | | | 52 | 42 | 32 | 22 | 12 | 02 | | |
| | | 53 | 43 | 33 | 23 | 13 | 03 | | | |
| | 54 | 44 | 34 | 24 | 14 | 04 | | | | |
| 55 | 45 | 35 | 25 | 15 | 05 | | | | | |

$[\zeta_5\ \zeta_4\ \cdots\ \zeta_0]$
$[\chi_5\ \chi_4\ \cdots\ \chi_0]$ $(\zeta\chi)_{RPE(x_0\_in)}$
$(\zeta\chi)_{RPE(x_1\_in)}$
$(\zeta\chi)_{RPE(x_2\_in)}$
$\vdots$

FIG. 17A

In '00', first '0' means $\zeta_0$'s index 0

| | | | | | 5 | 4 | 3 | 2 | 1 | 0 |
|---|---|---|---|---|---|---|---|---|---|---|
| | | | | | 5 | 4 | 3 | 2 | 1 | 0 |
| | | | | | 50 | 40 | 30 | 20 | 10 | 00 |
| | | | | 51 | 41 | 31 | 21 | 11 | 01 | |
| | | | 52 | 42 | 32 | 22 | 12 | 02 | | |
| | | 53 | 43 | 33 | 23 | 13 | 03 | | | |
| | 54 | 44 | 34 | 24 | 14 | 04 | | | | |
| 55 | 45 | 35 | 25 | 15 | 05 | | | | | |

$[\zeta_5 \, \zeta_4 \, \cdots \, \zeta_0]$
$[X_5 \, X_4 \, \cdots \, X_0]$ $(\zeta X)_{RPE(x_0\_in)}$
$(\zeta X)_{RPE(x_1\_in)}$
$(\zeta X)_{RPE(x_2\_in)}$
$\vdots$

FIG. 17B

In '00', first '0' means $\zeta_0$'s index 0

| | | | | | 5 5 | 4 4 | 3 3 | 2 2 | 1 1 | 0 0 |
|---|---|---|---|---|---|---|---|---|---|---|
| | | | | | 50 | 40 | 30 | 20 | 10 | 00 |
| | | | | 51 | 41 | 31 | 21 | 11 | 01 | |
| | | | 52 | 42 | 32 | 22 | 12 | 02 | | |
| | | 53 | 43 | 33 | 23 | 13 | 03 | | | |
| | 54 | 44 | 34 | 24 | 14 | 04 | | | | |
| 55 | 45 | 35 | 25 | 15 | 05 | | | | | |

$[\zeta_5 \ \zeta_4 \ \dots \ \zeta_0]$
$[\chi_5 \ \chi_4 \ \dots \ \chi_0]$ $(\zeta\chi)_{RPE(x_0\_in)}$
$(\zeta\chi)_{RPE(x_1\_in)}$
$(\zeta\chi)_{RPE(x_2\_in)}$
⋮

FIG. 17C

|   |   |   |   |   | 5 | 4 | 3 | 2 | 1 | 0 | $[a_5\ a_4\ ...\ a_0]$ |
|---|---|---|---|---|---|---|---|---|---|---|---|
|   |   |   |   |   | 5 | 4 | 3 | 2 | 1 | 0 | $[b_5\ b_4\ ...\ b_0]$ |
|   |   |   |   |   | 50 | 40 | 30 | 20 | 10 | 00 | (AB) $<_0$ |
|   |   |   |   | 51 | 41 | 31 | 21 | 11 | 01 |   | (AB) $<_1$ |
|   |   |   | 52 | 42 | 32 | 22 | 12 | 02 |   |   | (AB) $<_2$ |
|   |   | 53 | 43 | 33 | 23 | 13 | 03 |   |   |   | ⋮ |
|   | 54 | 44 | 34 | 24 | 14 | 04 |   |   |   |   |   |
| 55 | 45 | 35 | 25 | 15 | 05 |   |   |   |   |   |   |

FIG. 24

APPARATUS AND METHOD FOR MODULAR MULTIPLICATION

CROSS REFERENCE TO RELATED APPLICATION

This application claims the benefit of Korean Patent Application No. 10-2016-0177379, filed Dec. 23, 2016, which is hereby incorporated by reference in its entirety into this application.

BACKGROUND OF THE INVENTION

1. Technical Field

The present invention relates generally to technology for modular multiplication, and more particularly to technology for calculating modular multiplication by applying a systolic structure and a drain structure to an arithmetic unit operation.

2. Description of Related Art

Modular arithmetic in a prime field is the core operation process of a public key cryptosystem using a prime field. When a great number of bits must be processed in a public key operation using a prime field, it is necessary to consider an approach different from that used in a general CPU. If a typical configuration, in which control signals are broadcast to multiple registers, is used to process a public key operation, which requires control of multiple registers and a great number of bits, performance may be drastically degraded.

Currently, different methods for quickly processing time-consuming operations in various protocols, such as RSA, ECC, and the like, have been proposed. However, the proposed methods may generate an idle stage or cause a problem related to the generation of broadcasting signals.

Therefore, it is necessary to develop a modular multiplication technique that can be applied to various applications by overcoming existing disadvantages in such a way that a systolic structure and a drain structure are applied to an arithmetic unit operation. In connection with this, Korean Patent Application Publication No. 10-2010-0063623, (published on Jun. 11, 2010) discloses a technology related to "Method and apparatus for modular multiplication."

SUMMARY OF THE INVENTION

An object of the present invention is to solve an idle-time problem and a problem resulting from a broadcast structure, which occur in a prime-field arithmetic unit in the form of a systolic array.

Another object of the present invention is to solve a performance degradation problem by immediately providing a current result to a subsequent stage as input.

A further object of the present invention is to enable operation on a great number of bits to be performed by solving problems related to routing and broadcasting.

Yet another object of the present invention is to provide a modular multiplication apparatus in which modularization and systolization are possible.

Still another object of the present invention is to enable performance, application coverage, a size, a restriction on power consumption, and the like to be freely set depending on a user-desired form.

In order to accomplish the above objects, an apparatus for modular multiplication according to the present invention includes a first operation unit for performing a first operation based on a structure of at least one of a serial multiplier, which scans all partial products, and a serial squarer-based multiplier, which calculates a difference between a square of a sum of input values and a square of a difference of the input values; a second operation unit for performing a second operation based on a structure of at least one of the serial multiplier and the serial squarer-based multiplier; and an adder unit for outputting a result of adding a result of the first operation and a result of the second operation, feeding an intermediate value stream back to the first operation unit, which calculates a product of the intermediate value stream and a zeta parameter, and outputting a High-Order Term as a result of Montgomery modular multiplication, wherein the first operation unit and the second operation unit are configured to have a systolic structure, to respectively output the result of the first operation and the result of the second operation in digit-serial format, and to output the result of the first operation and the result of the second operation in order from a least significant digit to a most significant digit.

Here, at least one of the first operation unit and the second operation unit may process consecutive input sets based on a drain structure.

Here, the first operation unit may perform the first operation based on the serial multiplier, the second operation unit may perform the second operation based on the two serial squarer-based multipliers, the first operation unit may receive a secondary input value after input of a primary input value starts, and the second operation unit may simultaneously receive the primary input value and the secondary input value.

Here, the first operation unit and the second operation unit may respectively perform the first operation and the second operation based on the serial multiplier and receive a secondary input value after input of a primary input value starts.

Here, among cells of the first operation unit and cells of the second operation unit, cells that process a same degree may be processed after being merged.

Here, the first operation unit and the second operation unit may respectively perform the first operation and the second operation based on the two serial squarer-based multipliers and simultaneously receive a primary input value and a secondary input value.

Also, a method for modular multiplication, performed by an apparatus for modular multiplication, according to an embodiment of the present invention includes performing, by a first operation unit having a systolic structure, a first operation based on a structure of at least one of a serial multiplier, which scans all partial products, and a serial squarer-based multiplier, which calculates a difference between a square of a sum of input values and a square of a difference of the input values, and outputting, by the first operation unit, a result of the first operation in digit-serial format in order from a least significant digit to a most significant digit; performing, by a second operation unit having a systolic structure, a second operation based on a structure of at least one of the serial multiplier and the serial squarer-based multiplier, and outputting, by the second operation unit, a result of the second operation in digit-serial format in order from a least significant digit to a most significant digit; outputting a result of adding the result of the first operation and the result of the second operation; feeding an intermediate value stream back to the first operation unit, which is configured to calculate a product of the intermediate value stream and a zeta parameter; and outputting a High-Order Term as a result of Montgomery modular multiplication.

Here, at least one of performing the first operation and performing the second operation may be configured to process consecutive input sets based on a drain structure.

Here, performing the first operation may be configured to perform the first operation based on the serial multiplier by receiving a secondary input value after input of a primary input value starts; and performing the second operation may be configured to perform the second operation based on the two serial squarer-based multipliers by simultaneously receiving the primary input value and the secondary input value.

Here, performing the first operation and performing the second operation may be configured to respectively perform the first operation and the second operation based on the serial multiplier, and to receive a secondary input value after input of a primary input value starts.

Here, among cells of the first operation unit and cells of the second operation unit, cells that process a same degree may be processed after being merged.

Here, performing the first operation and performing the second operation may be configured to respectively perform the first operation and the second operation based on the two serial squarer-based multipliers, and to simultaneously receive a primary input value and a secondary input value.

BRIEF DESCRIPTION OF THE DRAWINGS

The above and other objects, features and advantages of the present invention will be more clearly understood from the following detailed description taken in conjunction with the accompanying drawings, in which:

FIG. 3 is a view that shows an algorithm for calculating Montgomery Modular Multiplication (MMM) according to a conventional art;

FIG. 5 is a view that shows a first algorithm for calculating MMM according to an embodiment of the present invention;

FIG. 6 is a view that shows a second algorithm that is a variation on the first algorithm according to an embodiment of the present invention;

FIG. 11 is a view that shows a third algorithm that is a variation on the first algorithm according to an embodiment of the present invention;

FIG. 14 is a view that shows a fourth algorithm that is a variation on the first algorithm according to an embodiment of the present invention;

FIGS. 17A to 17C are views for explaining a method for scanning Partial Products (PPs) according to an embodiment of the present invention;

FIG. 24 is a view for explaining the concept of scanning of a Partial Product Sum (PPS), processed in the multiplier of FIG. 23.

DESCRIPTION OF THE PREFERRED EMBODIMENTS

Figure 1:
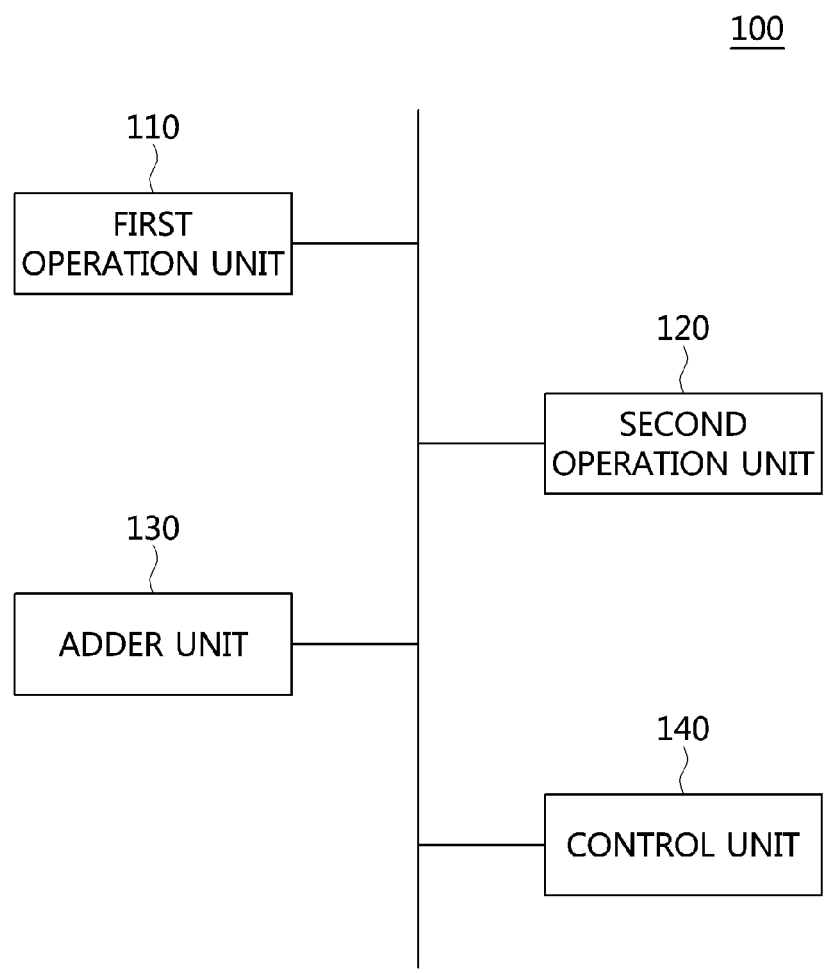
FIG. 1 is a block diagram that shows the configuration of a modular multiplication apparatus according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment according to the present invention will be described in detail with reference to the accompanying drawings.

FIG. 1 is a block diagram that shows the configuration of a modular multiplication apparatus according to an embodiment of the present invention.

As illustrated in FIG. 1, a modular multiplication apparatus 100 includes a first operation unit 110, a second operation unit 120, an adder unit 130, and a control unit 140.

First, the first operation unit 110 performs a first operation based on a structure of at least one of a Serial Multiplier (SM) and a Serial Squarer-based Multiplier (SSQ-M).

Also, the second operation unit 120 performs a second operation based on a structure of at least one of an SM and an SSQ-M.

Here, the SM may scan all partial products, and the SSQ-M may calculate the difference between the square of the sum of input values and the square of the difference of the input values.

Here, at least one of the first operation unit 110 and the second operation unit 120 may have a systolic structure, and may process successive input sets based on a drain structure. Also, the first operation unit 110 may output a result of the first operation in digit-serial format, and the second operation unit 120 may output a result of the second operation in digit-serial format.

Also, the first operation unit 110 and the second operation unit 120 may output the result of the first operation and the result of the second operation in order from the least significant digit to the most significant digit.

The configuration of the modular multiplication apparatus 100 may be largely categorized into three types depending on the structure that each of the first operation unit 110 and the second operation unit 120 selects from among an SM and an SSQ-M.

First, the modular multiplication apparatus 100 may be configured such that the first operation unit 110 performs the first operation based on an SM and such that the second operation unit 120 performs the second operation based on two SSQ-Ms.

In this case, the first operation unit 110 may calculate the sum of all partial products, corresponding to a first input value, and the second operation unit 120 may calculate the difference between the square of the sum of second input values and the square of the difference of the second input values.

Second, the modular multiplication apparatus 100 may be configured such that the first operation unit 110 and the second operation unit 120 perform the first operation and the second operation, respectively, based on an SM, which scans all partial products.

Here, the first operation unit 110 may calculate the sum of all partial products corresponding to a first input value, and the second operation unit 120 may calculate the sum of all partial products corresponding to second input values.

Third, the first operation unit 110 and the second operation unit 120 may perform the first operation and the second operation, respectively, based on two SSQ-Ms.

Here, the first operation unit 110 may calculate the difference between the square of the sum of first input values and the square of the difference of the first input values, and the second operation unit 120 may calculate the difference between the square of the sum of second input values and the square of the difference of the second input values.

Next, the adder unit 130 performs a Montgomery Modular Multiplication (MMM) calculation by adding the result of the first operation to the result of the second operation.

Here, the adder unit 130 outputs the sum of the result of the first operation and the result of the second operation and inputs an intermediate value stream to the first operation unit, whereby the first operation unit 110 may calculate the product of the intermediate value stream and a zeta parameter. Also, the adder unit 130 may output a High-Order Term (HOT) as the result of MMM.

Particularly, when each of the first operation unit 110 and the second operation unit 120 performs calculation based on a serial multiplier, the adder unit 130 may merge the first operation result and the second operation result for the same degree. That is, among the cells of the first operation unit 110 and the cells of the second operation unit 120, cells that process the same degree may be merged and processed by the adder unit 130.

The control unit 140 may select a structure, on which the first operation unit 110 and the second operation unit 120 depend when performing an operation, from among multiple structures.

The control unit 140 may select a structure, on which the first operation unit 110 and the second operation unit 120 depend when performing an operation, from among one or more SMs and SSQ-Ms included in the modular multiplication apparatus 100.

The control unit 140 may set an operation mode in which the operation is to be performed, among the first operation mode and the second operation mode, and may disable structures other than the structure corresponding to the operation mode. Here, the operation mode may include at least one of an RSA algorithm execution mode and an Elliptic Curve Cryptography (ECC) algorithm execution mode, and the first operation mode and the second operation mode may perform an operation by being simultaneously enabled.

Hereinafter, a modular multiplication method performed by a modular multiplication apparatus according to an embodiment of the present invention will be described in detail with reference to FIG. 2.

Figure 2:
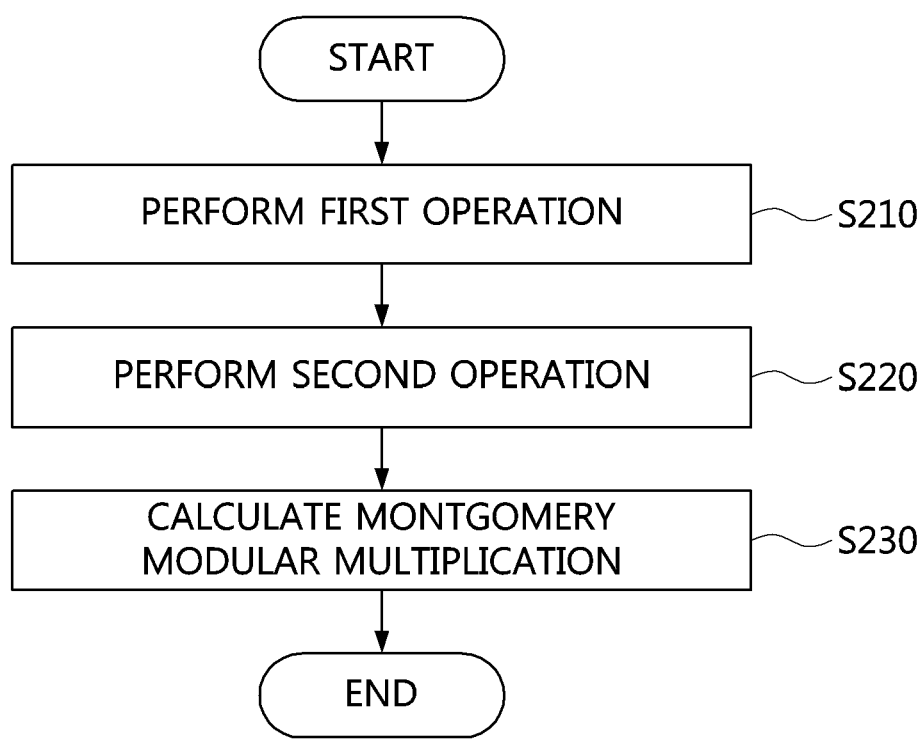
FIG. 2 is a flowchart that shows a modular multiplication method performed by a modular multiplication apparatus according to an embodiment of the present invention.

FIG. 2 is a flowchart that shows a modular multiplication method performed by a modular multiplication apparatus according to an embodiment of the present invention.

For the convenience of description, the processes of modular multiplication are sequentially described, but the sequence of the modular multiplication processes is not limited to the sequence shown in FIG. 2, and operations therein may be simultaneously performed.

A modular multiplication apparatus 100 performs a first operation at step S210.

The modular multiplication apparatus 100 performs the first operation based on a structure of at least one of a serial multiplier (SM) and a serial squarer-based multiplier (SSQ-M). Then, the result of the first operation may be output in digit-serial format.

Subsequently, the modular multiplication apparatus 100 performs a second operation at step S220.

The modular multiplication apparatus 100 may perform the second operation based on a structure of at least one of an SM and an SSQ-M, and may then output the result of the second operation in digit-serial format.

Also, at steps S210 and S220, the modular multiplication apparatus 100 may process successive input sets based on a drain structure. The modular multiplication apparatus 100 may perform an operation based on a systolic structure.

Here, the modular multiplication apparatus 100 may perform the first operation based on an SM and may perform the second operation using two SSQ-Ms. Here, the SM, which performs the first operation, and the two SSQ-Ms, which perform the second operation, may process successive input sets based on a drain structure.

Also, at step S210, the first operation is performed based on the SM by receiving a secondary input value after the input of a primary input value starts. At step S220, the second operation may be performed based on the two SSQ-Ms by receiving the primary input value and the second input value at the same time. Here, the primary input value indicates a value that is first input, among the first input values that are input to the serial multiplier, and the secondary input value indicates a value that is input later than the primary input value, among the first input values, which are input to the serial multiplier.

The modular multiplication apparatus 100 may perform the first operation and the second operation based on an SM. At steps S210 and S220, the first operation and the second operation may be performed based on the serial multiplier by receiving a secondary input value after the input of a primary input value starts. Here, the primary input value indicates a value that is first input to the serial multiplier, among the first input value and the second input value, and the secondary input value indicates a value that is input later than the primary input value, among the first input value and the second input value.

Also, the modular multiplication apparatus 100 may perform the first operation and the second operation based on a serial squarer-based multiplier (SSQ-M). At steps S210 and S220, the modular multiplication apparatus 100 may perform the first operation and the second operation based on two SSQ-Ms by receiving the primary input value and the secondary input value at the same time.

When it performs the first operation and the second operation base on the SM and the SSQ-M, the modular multiplication apparatus 100 may calculate the sum of all partial products, corresponding to the first input value, and may calculate the difference between the square of the sum of the second input values and the square of the difference of the second input values.

When it performs the first operation and the second operation based on the SM, the modular multiplication apparatus 100 may calculate the sum of all partial products, corresponding to the first input value and the second input value.

Also, when it performs the first operation and the second operation based on the SSQ-M, the modular multiplication apparatus 100 may calculate the difference between the square of the sum of the first input values and the square of the difference of the first input values, and may calculate the difference between the square of the sum of the second input values and the square of the difference of the second input values.

Subsequently, the modular multiplication apparatus 100 performs a Montgomery Modular Multiplication (MMM) calculation using the result of the first operation and the result of the second operation at step S230.

The modular multiplication apparatus 100 adds the result of the first operation and the result of the second operation. Here, the modular multiplication apparatus 100 may output the sum of the result of the first operation and the result of the second operation, and may output the result of the first operation and the result of the second operation in digit-serial format. Also, the modular multiplication apparatus 100 may output each of the result of the first operation and the result of the second operation in order from the least significant digit to the most significant digit.

Also, the modular multiplication apparatus 100 may feed an intermediate value stream back to the first operation unit so as to calculate the product of the intermediate value stream and a zeta parameter. Also, the modular multiplication apparatus 100 may output a High-Order Term (HOT) as the result of Montgomery Modular Multiplication (MMM).

In the conventional art, MMM is calculated in such a way that an intermediate result value in a carry-save form is added after passing through a carry-propagating adder (CPA), and is then combined with $q_i$. However, the modular multiplication apparatus 100 according to an embodiment of the present invention may calculate MMM by merely outputting the generated least significant digit (LSD) stream.

Although the modular multiplication processes in FIG. 2 have been described by assigning numbers thereto for the convenience of description, all the steps may be performed such that they overlap each other.

The modular multiplication apparatus 100 according to an embodiment of the present invention employs an operation method that is more suitable for hardware by improving an algorithm level. In this process, the characteristics of an invariant become complicated and a format becomes different from a desired result format, but the final operation result is output in a valid format.

Also, in the process of implementing the algorithm in hardware, the modular multiplication apparatus 100 may remove the post-processing process of the existing method, which is required for operation, and may maintain a systolic characteristic. In the case of the conventional art, even if a core calculator has excellent features, systolicity may be compromised during the process of integrating the core calculator with a controller and a system, but the modular multiplication apparatus 100 according to an embodiment of the present invention solves the problems with the convention art by gathering input and output to one side and configuring them as a stream structure.

Hereinafter, a method for calculating MMM according to a conventional art will be described with reference to FIG. 3 and FIG. 4.

Figure 4:
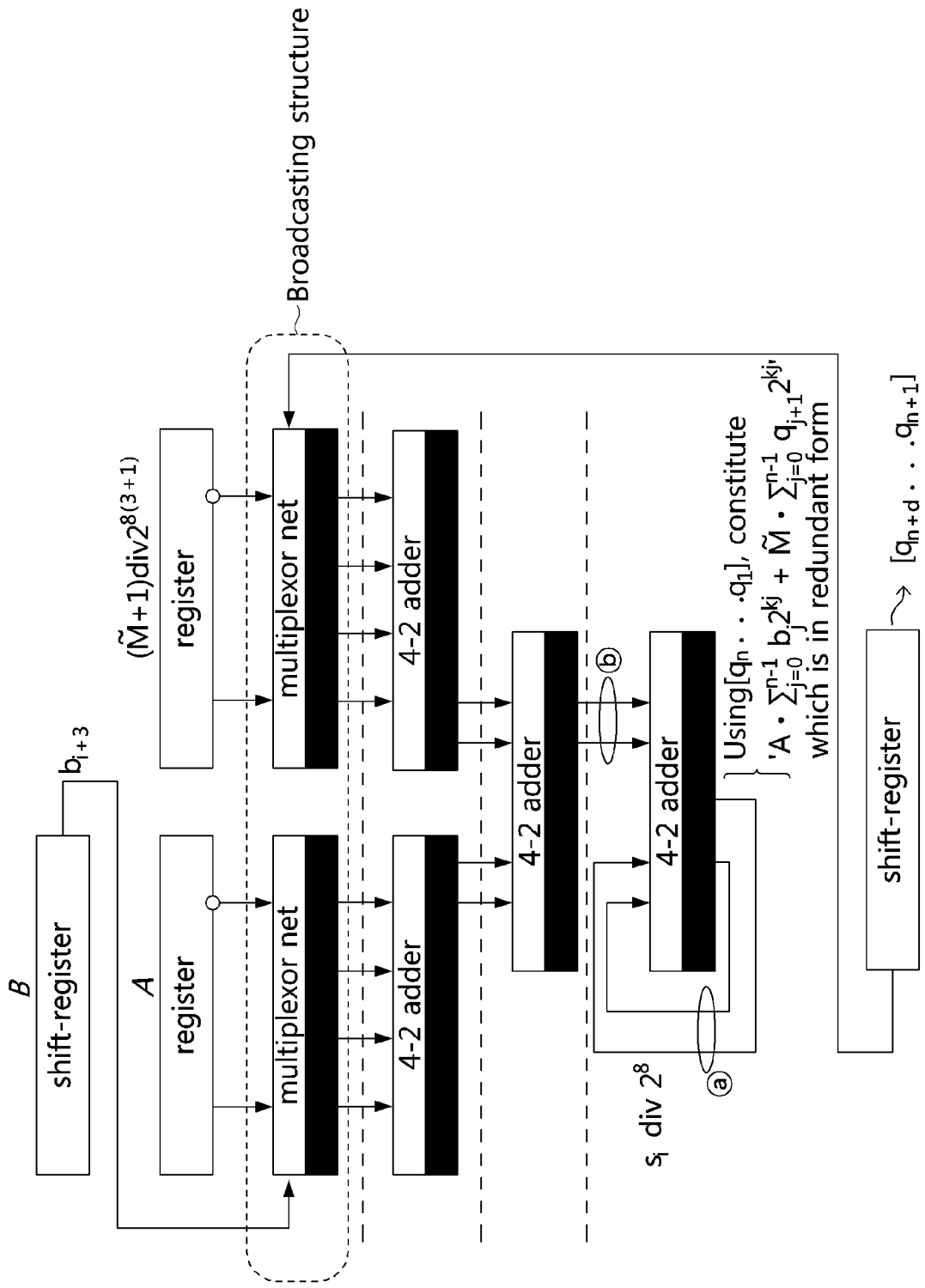
FIG. 4 is a view that shows a hardware structure for calculating MMM according to a conventional art.

FIG. 3 is a view that shows an algorithm for calculating Montgomery Modular Multiplication (MMM) according to the conventional art, and FIG. 4 is a view that shows a hardware structure for calculating MMM according to the conventional art.

In FIG. 3, k denotes a radix and d denotes a delay parameter. The algorithm shown in FIG. 3 is designed to solve a delay problem with the previous algorithm. In order to prevent the case in which the product of the previous value $q_i$ incurs a delay, and the delay causes the calculation of the current $S_{i+1}$ to be late, the algorithm in FIG. 3 is derived by deepening the invariant in the previous algorithm.

In the algorithm shown in FIG. 3, in order to calculate $S_{i+1}$, the annihilation of $q_i$ is realized, as shown in the following Equation (1):

$$s_{i+1} = M''M\frac{q_{-d}}{2^{k(d+i+1)}} + \frac{a_0 B}{2^{ki}} + \qquad (1)$$

$$\frac{q_{-d} - q_0 2^{kd}}{2^{k(d+i+1)}} \cdots + M''M\frac{q_{i-d}}{2^{k(d+1)}} + a_i B + \frac{q_{i-d} - q_i 2^{kd}}{2^{k(d+1)}}$$

Accordingly, in the conventional art, hardware must be configured such that an intermediate result is maintained as ⓐ in FIG. 4 and $q_{i-d}\zeta + a_i B$ is added to the intermediate result.

Hereinafter, a first algorithm for calculating MMM according to an embodiment of the present invention will be described in detail with reference to FIG. 5.

FIG. 5 is a view that shows a first algorithm for calculating MMM according to an embodiment of the present invention.

As illustrated in FIG. 5, the first algorithm satisfies $\Sigma(Q\zeta)_{PS_i} = Q\zeta$, and $[(Q\zeta)_{PS_i}(Q\zeta)_{PS_{i-1}} \ldots (Q\zeta)_{PS_0}] = \Sigma_{j=0}^{i} (Q\zeta)_{PS_j} 2^{kj}$ includes the i-th column in Partial Products (PPs) of $Q\zeta$. Also, $(Q\zeta)_{PS_i}$ indicates any value that satisfies the above requirement.

As shown in FIG. 5, the first algorithm according to an embodiment of the present invention may modularize operations. The first algorithm of FIG. 5 maintains $-[q_i q_{i-1} \ldots q_1]$ during the operation process, whereby hardware may be configured such that $$\frac{q_1}{2^k}$$

is output in the operation process. That is, the first algorithm may realize a modulated structure in which Qζ and AB are respectively calculated and $q_i$ is produced while Least Significant Digits (LSDs) are consistently calculated from Qζ and AB.

That is, because the first algorithm is configured with Recurrent Equation (4) and invariant (5) in FIG. 5, $q_i$ is not annihilated during the operation, whereby the result of MMM may be finally calculated even though the intermediate value, corresponding to ⓐ in FIG. 4 according to the conventional art, is not locally maintained.

Hereinafter, an example of variation on the first algorithm according to an embodiment of the present invention will be described in detail with reference to FIGS. 6 to 15.

The second to fourth algorithms to be described later are variations on the first algorithm. Here, $q_i$ is not annihilated in an intermediate stage, and the invariant (5) of the first algorithm is shared.

Hereinafter, the second algorithm according to an embodiment of the present invention will be described in detail with reference to FIGS. 6 to 10.

FIG. 6 is a view that shows the second algorithm, which is a variation on the first algorithm according to an embodiment of the present invention.

The second algorithm illustrated in FIG. 6 calculates Qζ and AB using a serial multiplier and two serial squarer-based multipliers through an RPE, as Recurrent Equation (6) and invariant (8), whereby $q_i$ is not annihilated in an intermediate stage.

Also, the second algorithm uses $$(Q\zeta)_{RPE(q_{i-d\_in})}$$

and $([(a+b)^2]_i - [(a-b)^2]_i)$ as a term for updating $S_{i+1}$, whereby $[q_i q_{i-1} \ldots q_1]$ is maintained in the intermediate result. This seems to make $S_{i+1}$ meaningless, but the final result takes the form of MMM by performing post-processing, as in the previous algorithm.

According to the conventional art in FIG. 4, when MMM is calculated, an invariant is formed by making the format of $S_{i+1}$ similar to the final result. Accordingly, the result of MMM is output by performing post-processing for the intermediate result. Here, in the post-processing process according to the conventional art in FIG. 4, multiple $q_i$ and ⓐ in FIG. 4, which is an intermediate result in carry-save form, are added after passing through a CPA and are combined. However, the second algorithm according to an embodiment of the present invention merely outputs the generated LS) stream.

The following Equation (2) shows the result of the first algorithm, and Equation (3) shows the result of the second algorithm.

$$s_{n+d+1} = \frac{\lfloor (Q\zeta)_{PS_{n+d}} (Q\zeta)_{PS_{n+d-1}} \cdots (Q\zeta)_{PS_0} \rfloor}{2^{k(n+d)}} + \frac{\lfloor (AB)_{PS_{n+d}} (AB)_{PS_{n+d-1}} \cdots (AB)_{PS_0} \rfloor - [q_{n+d} q_{n+d-1} \cdots q_1]}{2^{k(n+d)}}$$

$$= \frac{[q_n \cdots q_1]\frac{M''M+1}{2^{k(d+1)}} + AB - [q_{n+d} \cdots q_{n+1}]2^{kn} - [q_n \cdots q_1]}{2^{k(n+d)}}$$

$$= \frac{[q_n \cdots q_1]M''M + AB - [q_{n+d} \cdots q_{n+1}]2^{kn}}{2^{k(n+d)}}$$

$$s_{n+d+1} = \frac{\lfloor (Q\zeta)_{Z_{n+d}} (Q\zeta)_{Z_{n+d-1}} \cdots (Q\zeta)_{Z_0} \rfloor}{2^{k(n+d)}} + \frac{\lfloor (AB)_{Z_{n+d}} (AB)_{Z_{n+d-1}} \cdots (AB)_{Z_0} \rfloor - [q_{n+d} q_{n+d-1} \cdots q_1]}{2^{k(n+d)}} \quad (3)$$

$$= \frac{[q_n \cdots q_1]\frac{M''M+1}{2^{k(d+1)}} + AB - [q_{n+d} \cdots q_{n+1}]2^{kn} - [q_n \cdots q_1]}{2^{k(n+d)}}$$

$$= \frac{[q_n \cdots q_1]M''M + AB - [q_{n+d} \cdots q_{n+1}]2^{kn}}{2^{k(n+d)}}$$

As shown in Equation (2) and Equation (3), the first algorithm and the second algorithm finally output the same $S_{i+1}$.

As described above, the second algorithm uses $$(Q\zeta)_{RPE(q_{i-d\_in})}$$

and $([(a+b)^2]_i - [(a-b)^2]_i)$, and thereby the invariant of the intermediate result value $S_{i+1}$ is transformed from the previous invariant. Accordingly, the second algorithm may solve the existing problems that occur when hardware is implemented, and may implement a systolic structure.

Here, $$(Q\zeta)_{RPE(q_{i-d\_in})}$$

represents a PPs scanning method for acquiring a Partial Product Sum (PPS), and will be described later with reference to FIG. 17.

Figure 7:
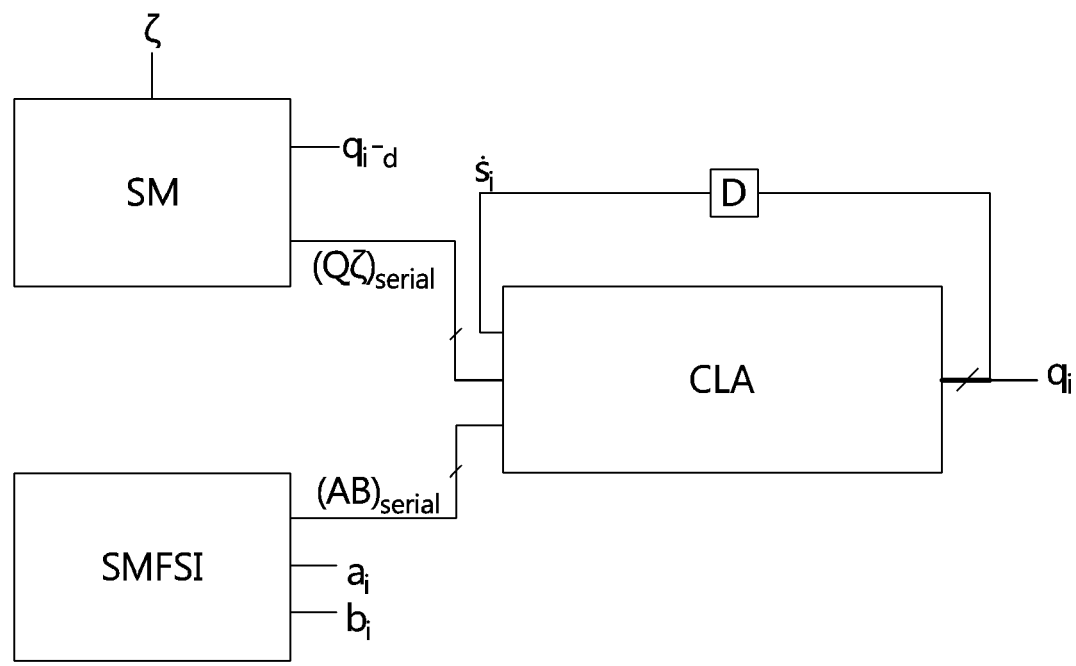
FIG. 7 is a view that shows hardware for processing the second algorithm according to an embodiment of the present invention.
Figure 8A:
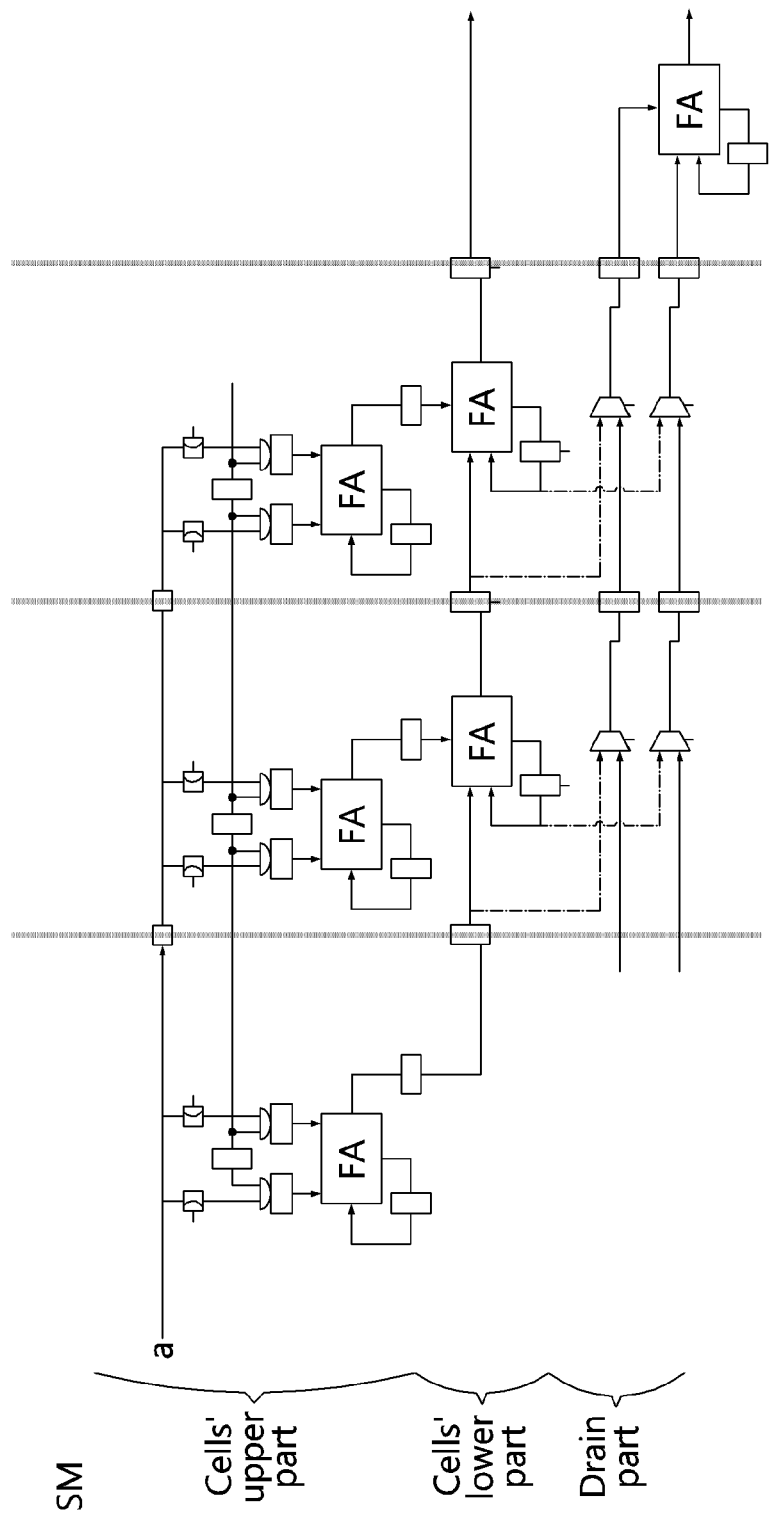
FIGS. 8A and 8B are views that show an example of the hardware configuration of FIG. 7.
Figure 8B:
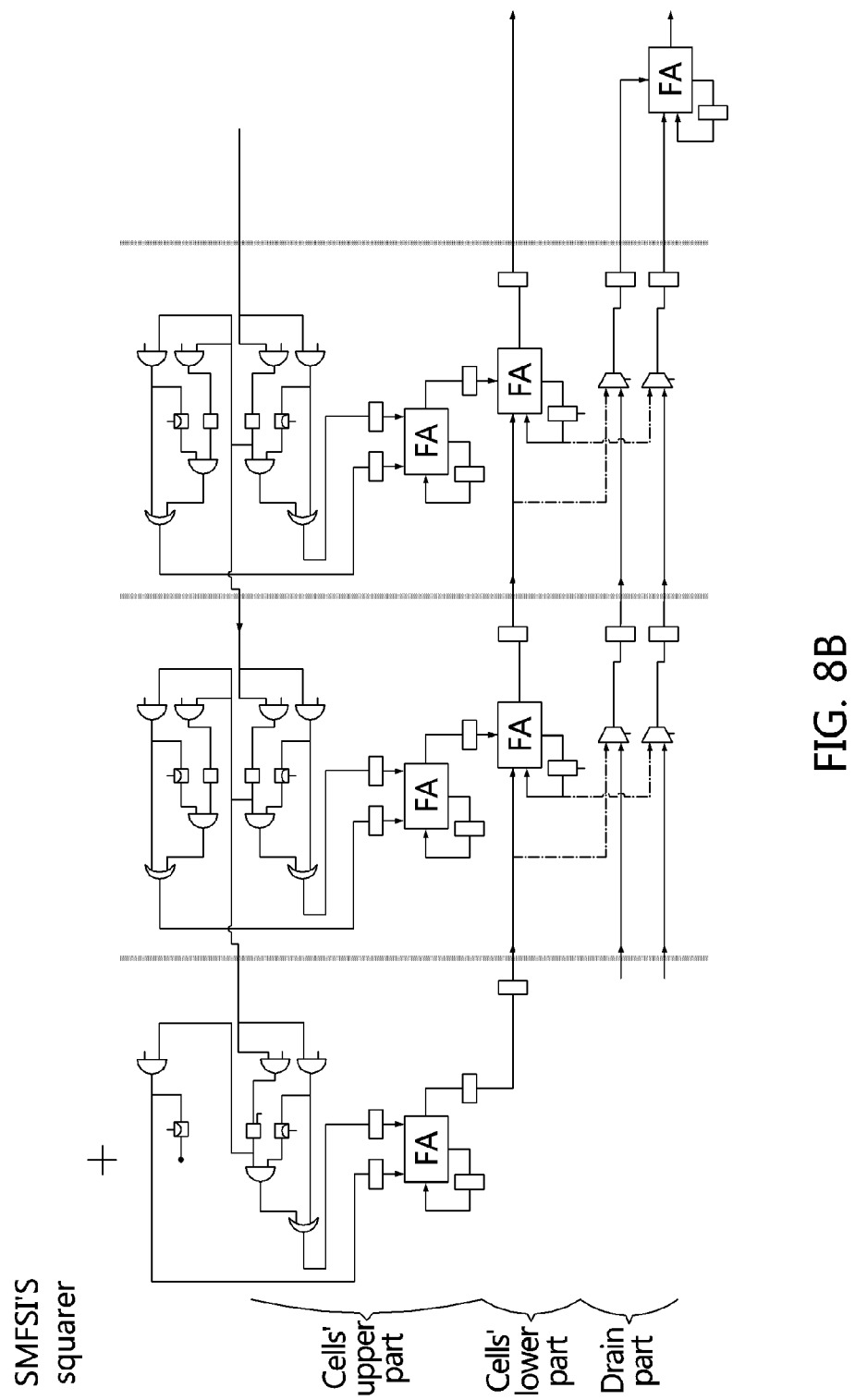

FIG. 7 is a view that shows hardware for processing the second algorithm according to an embodiment of the present invention, and FIG. 8 is a view that shows an example of the configuration of the hardware in FIG. 7.

As illustrated in FIG. 7, an SM outputs a result of calculation of $$(Q\zeta)_{RPE(q_{i-d\_in})}$$

in digit-serial format, an SMFSI calculates $([(a+b)^2]_i - [(a-b)^2]_i) \gg 2$, and the second algorithm may calculate MMM by adding the two operation results.

Here, in FIG. 7, $\dot{s}_i$ denotes a partial value of $s_i$. Also, the hardware illustrated in FIG. 7, which corresponds to the second algorithm, is configured such that all input/output ports are located at the right side corresponding to the position of a CLA the aspect of architecture. Accordingly, feedback may be easily provided, and an additional component for collecting results is not required. That is, a P&R problem, occurring when a System-on-Chip (SoC) and, a Field-Programmable Gate Array (FPGA) are implemented, may be solved, and the implementation is easy.

Also, the two serial squarer-based multipliers, corresponding to an SM and an SMFSI in FIG. 7, employ a drain structure, whereby successive input sets may be processed and the operation efficiency of the calculator may be improved.

Although it performs iteration for additional modular reduction, the second algorithm may immediately perform the operation process of the next stage. All input sets for performing the current operation are input, and $q_{i-d}$ and $\{a_i,b_i\}=\{0,0\}$ for iteration for additional modular reduction are input.

In the conventional algorithm, a new set cannot be input due to $\{a_i,b_i\}=\{0,0\}$. However, in the second algorithm according to an embodiment of the present invention, because $q_{i-d}$ of the new set is 0 during the first (d+1) clocks, there is nothing to be processed, and $q_{i-d}$ of the existing set may be continually input without change, and may then be processed.

Also, $\{a_i,b_i\}$ of the new set is input while $\{a_i,b_i\}$ of the existing set is drained, and this generates an effect of inputting $\{a_i,b_i\}=\{0,0\}$. That is, through a drain-induced barrier and the input of $q_{i-d}$ of the existing set during a zero $q_{i-d}$ stage, the input of $q_{i-d}$ and $\{a_i,b_i\}=\{0,0\}$, required for iteration for additional modular reduction, is implemented, whereby sets may be consecutively input. Also, a performance degradation problem resulting from parameter d may be solved.

Also, the SM and SMFSI of FIG. 7 may be configured as shown in FIG. 8, and the configuration thereof is not limited to these examples.

Figure 9:
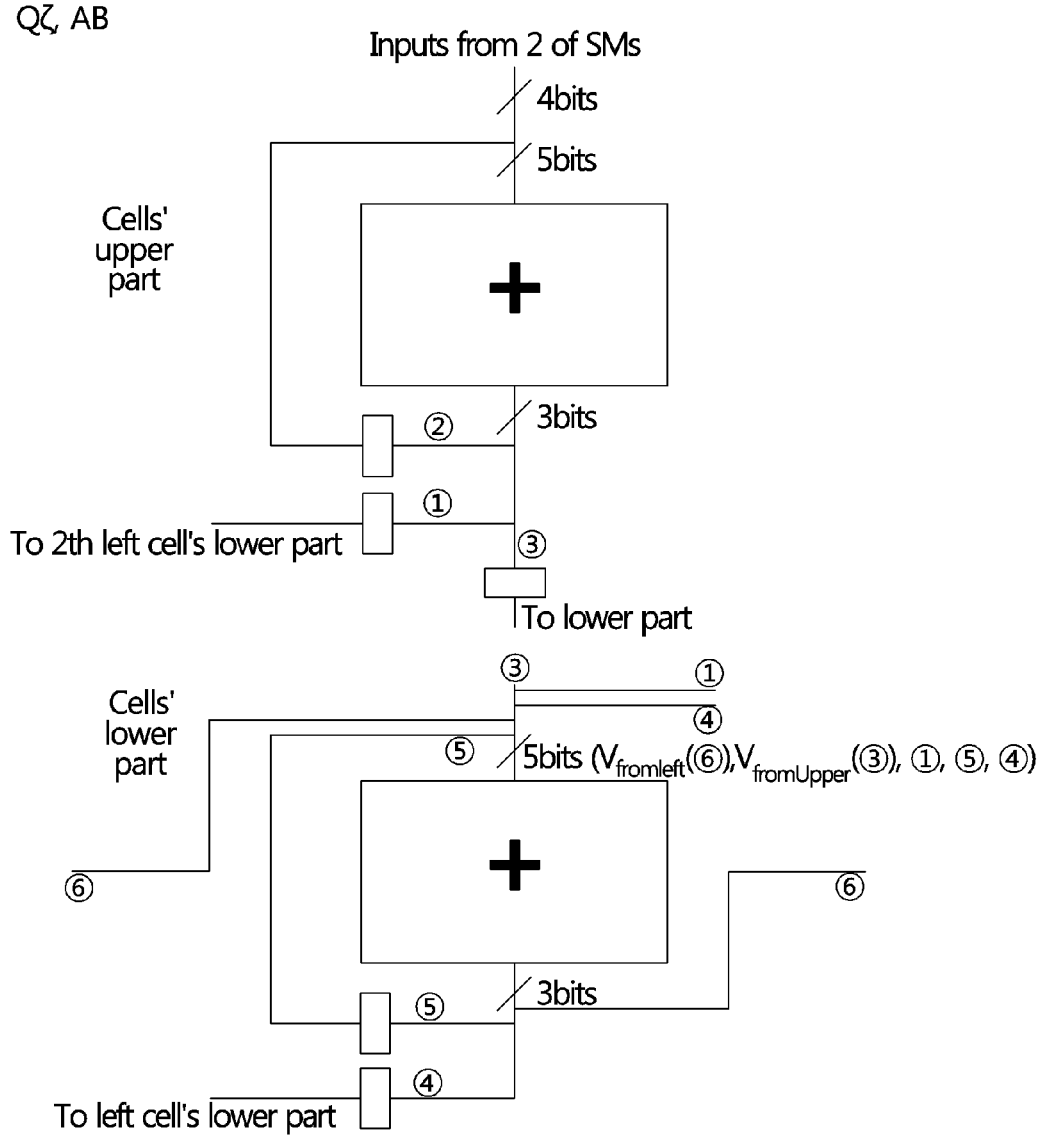
FIG. 9 is a view for explaining a method for merging cells when a unit for MMM is configured with two serial multipliers (SMs)

FIG. 9 is a view for explaining a method for merging cells when a unit for MMM is configured using two SMs.

When a unit for MMM is configured using two SMs, a modular multiplication apparatus merges cells, as shown in FIG. 9. If two SMs are used, a radix is 2, and when the same degree of cells of Qζ and AB are combined, 2 bits corresponding to the respective cells are added. Here, the worst case in the adder may be represented as shown in FIG. 10.

Figure 10:
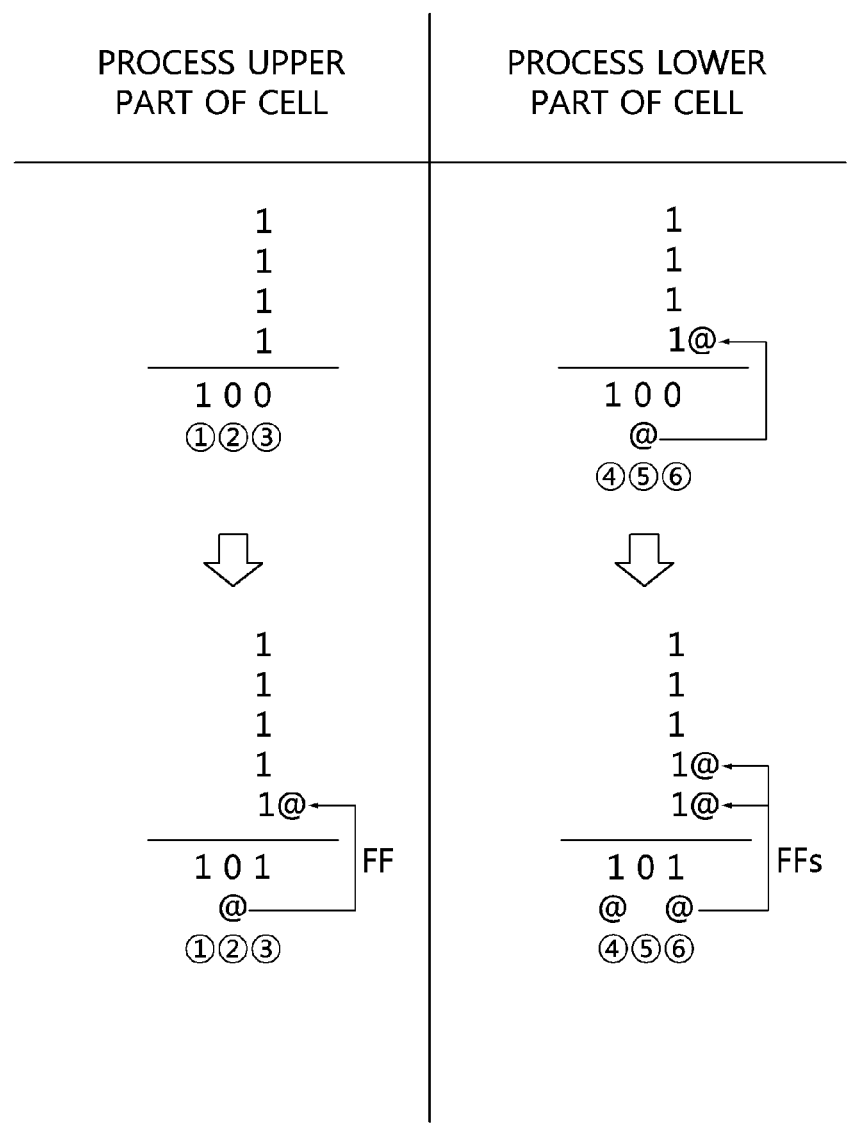
FIG. 10 is a view for explaining the process of merging cells according to an embodiment of the present invention.

FIG. 10 is a view for explaining the process of merging cells according to an embodiment of the present invention.

For the convenience of description, all bits are represented as 1 in order to assume the worst case. First, when 2 bits of the respective cells are added, ② may be stored by being processed as a carry. Here, the width of bits 101 does not change, and consequently, the upper part of the cell is processed as shown in FIG. 10.

As illustrated in FIG. 10, when the upper part of a cell is processed, ① is delivered to the lower part of the second left cell. Accordingly, the lower part of the cell may process the total of three values, which are a value delivered from the left side, a value delivered from the upper side, and ①.

Then, the carry may be processed in the lower part of the cell. When the carry is processed in the lower part of the cell, one more value (@) to be added is generated, as shown in FIG. 10.

When the sum of all four values are processed, the resultant value is 3 bits, ⑤ is fed back as a carry, ⑥ is delivered to the right side, and ④ is delivered to the lower part of the left cell. Consequently, the operation of the lower part of the cell may be represented as shown in FIG. 10.

Hereinafter, the third algorithm according to an embodiment of the present invention will be described in detail with reference to FIGS. 11 to 13.

FIG. 11 is a view that shows the third algorithm, which is a variation on the first algorithm according to an embodiment of the present invention.

As illustrated in FIG. 11, the third algorithm is acquired by simplifying the second algorithm, or is an algorithm modified to the form of a stream suitable for a network processor or the like.

The third algorithm calculates Qζ and AB using a serial multiplier through RPE, as Recurrent Equation (9) and invariant (11), whereby $q_i$ is not annihilated in an intermediate stage.

Figure 12:
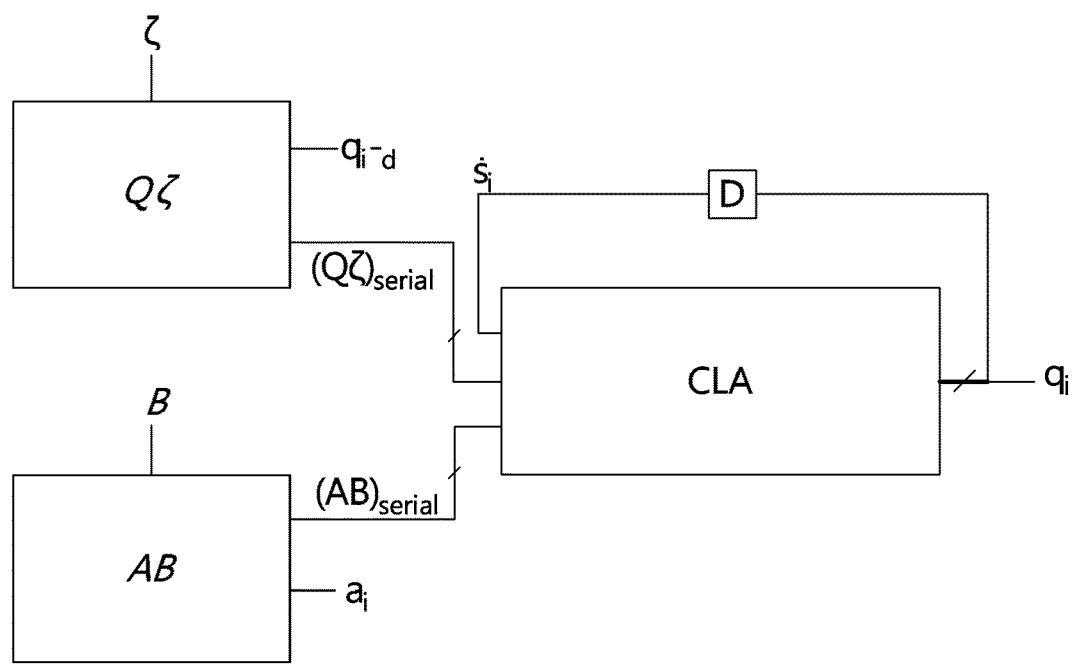
FIG. 12 is a view that shows hardware for processing the third algorithm according to an embodiment of the present invention.

FIG. 12 is a view that shows hardware for processing the third algorithm according to an embodiment of the present invention.

As illustrated in FIG. 12, a unit for Qζ outputs a result of calculation of $$(Q\zeta)_{RPE(q_{i-d}\_in)}$$

in any digit-serial format, and a unit for AB calculates $$(AB)_{RPE(a_i\_in)}$$

and outputs the result thereof in any digit-serial format. Then, MMM may be calculated by adding $$(Q\zeta)_{RPE(q_{i-d}\_in)} \text{ and } (AB)_{RPE(a_i\_in)}.$$

Here, a drain structure is applied to components that calculate Qζ and AB, whereby successive input sets may be processed, and the efficiency of operation of the calculator may be improved. Also, for the two SMs for calculating Qζ and AB, cells in the same degree are merged, whereby the number of flip-flops (FF) may be decreased, and the extent of hardware usage may be decreased.

As shown in FIG. 12, when calculating the AB output stream, the hardware for processing the third algorithm may calculate the output stream by sequentially inputting B and A, rather than simultaneously inputting A and B.

When the output stream is calculated as described above, there may be a limitation as to the time at which A and B are to be input. However, there is no need to use two serial squarer-based multipliers in order to calculate the AB output stream, which is advantageous from the aspect of the extent of hardware usage.

Figure 13:
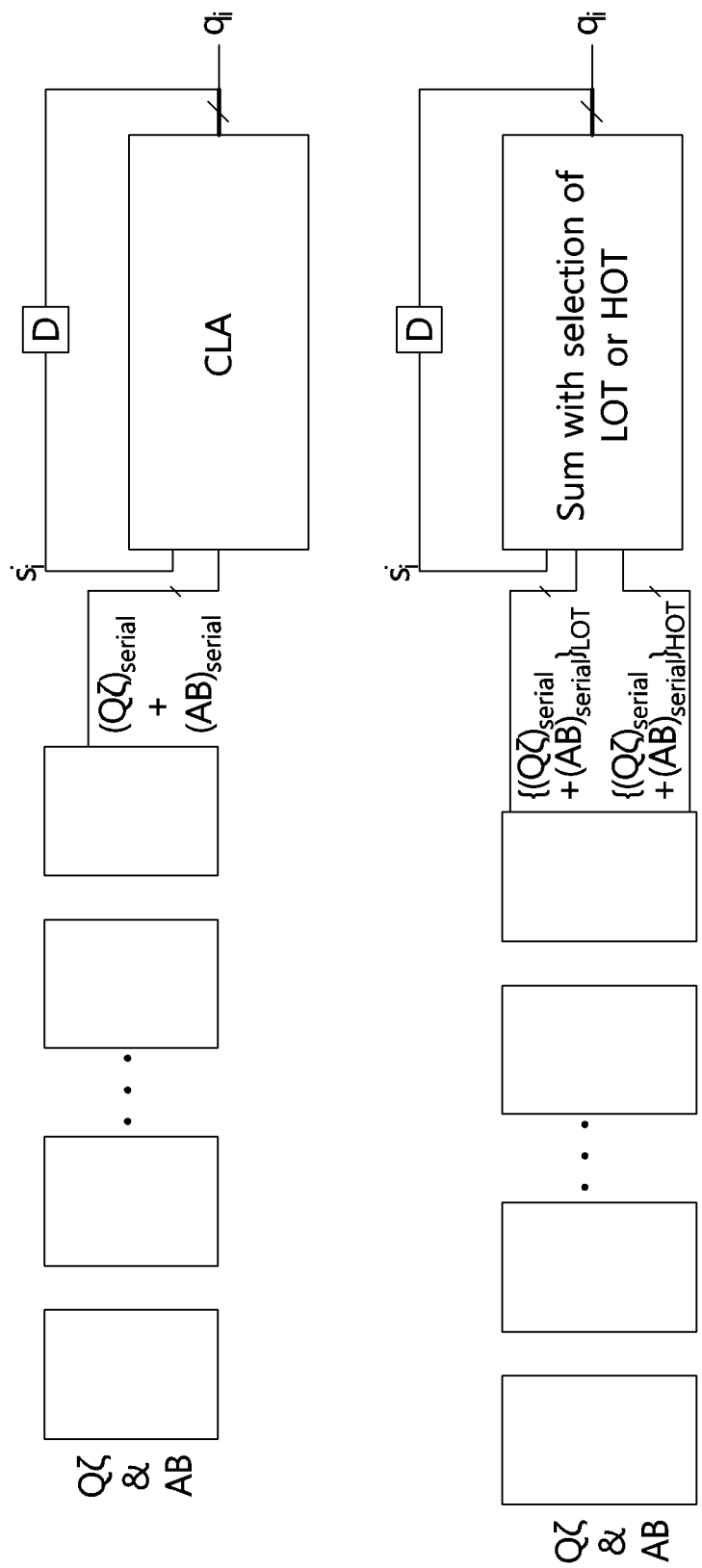
FIG. 13 is a view for explaining a method for decreasing the number of flip-flops when implementing the third algorithm according to an embodiment of the present invention.

FIG. 13 is a view for explaining a method for decreasing the number of flip-flops (FF) when implementing the third algorithm according to an embodiment of the present invention.

In FIG. 13, $\{(Q\zeta)_{serial}+(AB)_{serial}\}_{LOT}$ and $\{(Q\zeta)_{serial}+(AB)_{serial}\}_{HOT}$ indicate a Low-Order Term and a High-Order Term, respectively, when a drain structure is applied to a calculator. Also, as shown in FIG. 13, cells processing the same degree in the AB part and the Qζ part are combined and the values are added, whereby the number of flip-flops (FFs) may be decreased.

Hereinafter, the fourth algorithm according to an embodiment of the present invention will be described in detail with reference to FIG. 14 and FIG. 15.

Figure 15:
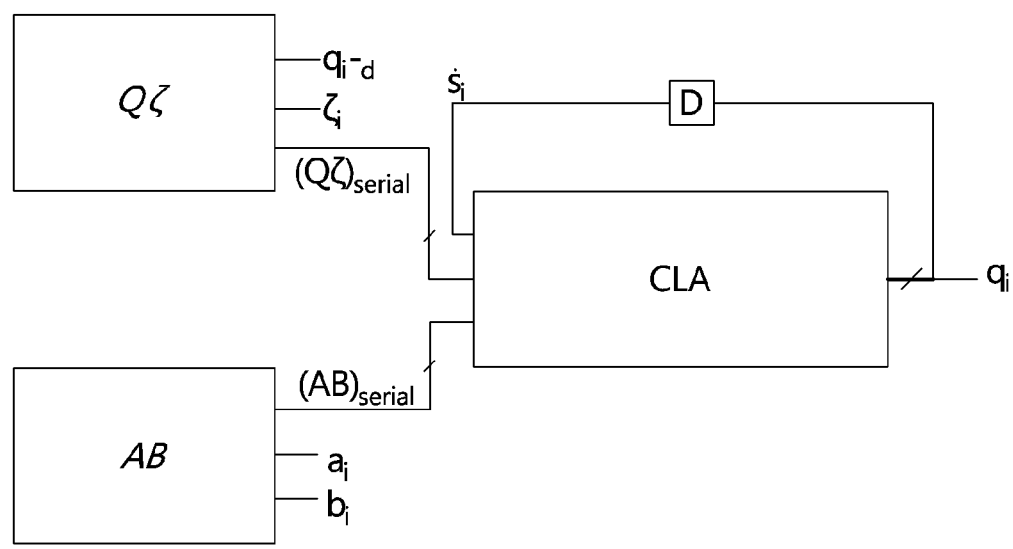
FIG. 15 is a view that shows hardware for processing the fourth algorithm according to an embodiment of the present invention.

FIG. 14 is a view that shows a fourth algorithm, which is a variation on the first algorithm according to an embodiment of the present invention, and FIG. 15 is a view that shows hardware for processing the fourth algorithm according to an embodiment of the present invention.

As illustrated in FIG. 14 and FIG. 15, the fourth algorithm calculates Qζ and AB using two serial squarer-based multipliers, which respectively correspond to Recurrent Equation (12) and invariant (14) of FIG. 14. That is, the fourth algorithm is an MMM calculation systolic algorithm in which $q_i$ is not annihilated in an intermediate stage.

The unit for Qζ in FIG. 15 outputs a result of calculation of $([(Q+\zeta)^2]_i[(Q-\zeta)^2]_i)\!\gg\!2$ in any digit-serial format, and the unit for AB in FIG. 15 calculates $([(a+b)^2]_i-[(a-b)^2]_i)\gg 2$ and outputs the result thereof in any digit-serial format. Then, the fourth algorithm may calculate MMM by adding the output from the unit for $Q\zeta$ and the output from the unit for AB.

Here, a drain structure is applied to the two serial squarer-based multipliers, corresponding to the unit for $Q\zeta$ and the unit for AB, whereby consecutive input sets may be processed and the operation efficiency of the calculator may be improved.

The fourth algorithm inputs Q and $\zeta$ at the same time, as A and B. Here, because $(Q\zeta)_{serial}$ is calculated in the same manner as the calculation of $(AB)_{serial}$, the hardware extent is increased clue to the use of a serial squarer-based multiplier. However, the fourth algorithm in FIG. 14 is very effective when applied in a network processor environment or the like, in which $\zeta$ frequently changes.

Because the modular multiplication apparatus according to an, embodiment of the present invention is characterized in that an intermediate value, corresponding to ⓐ in FIG. 4 according to the conventional art, need not be locally stored in one place, the hardware illustrated in FIG. 7, FIG. 12, and FIG. 15 may be implemented as a systolic structure. The second to fourth algorithms according to an embodiment of the present invention acquire systolicity by breaking the invariant of the conventional algorithm illustrated in FIG. 3.

Also, the modular multiplication apparatus according to an embodiment of the present invention may immediately perform a new operation without an interval between input sets caused by parameter d. In the case of the conventional systolic architecture, 1 clock idle time is present between the input bits. However, in the case of the modular multiplication apparatus according to an embodiment of the present invention, results for respective digits in $S_{i+1}$ are not sequentially output throughout a clock for each cell, but are processed by being distributed to all cells and processed therein in a 'carry/save from' state.

Because an intermediate result is not locally stored as described above, the modular multiplication apparatus enables modularization and systolization and is superior to the conventional operation method using a Carry Save Adder (CSA).

Hereinafter, an example of the application of a modular multiplication apparatus according to an embodiment of the present invention will be described in detail with reference to FIG. 16.

Figure 16:
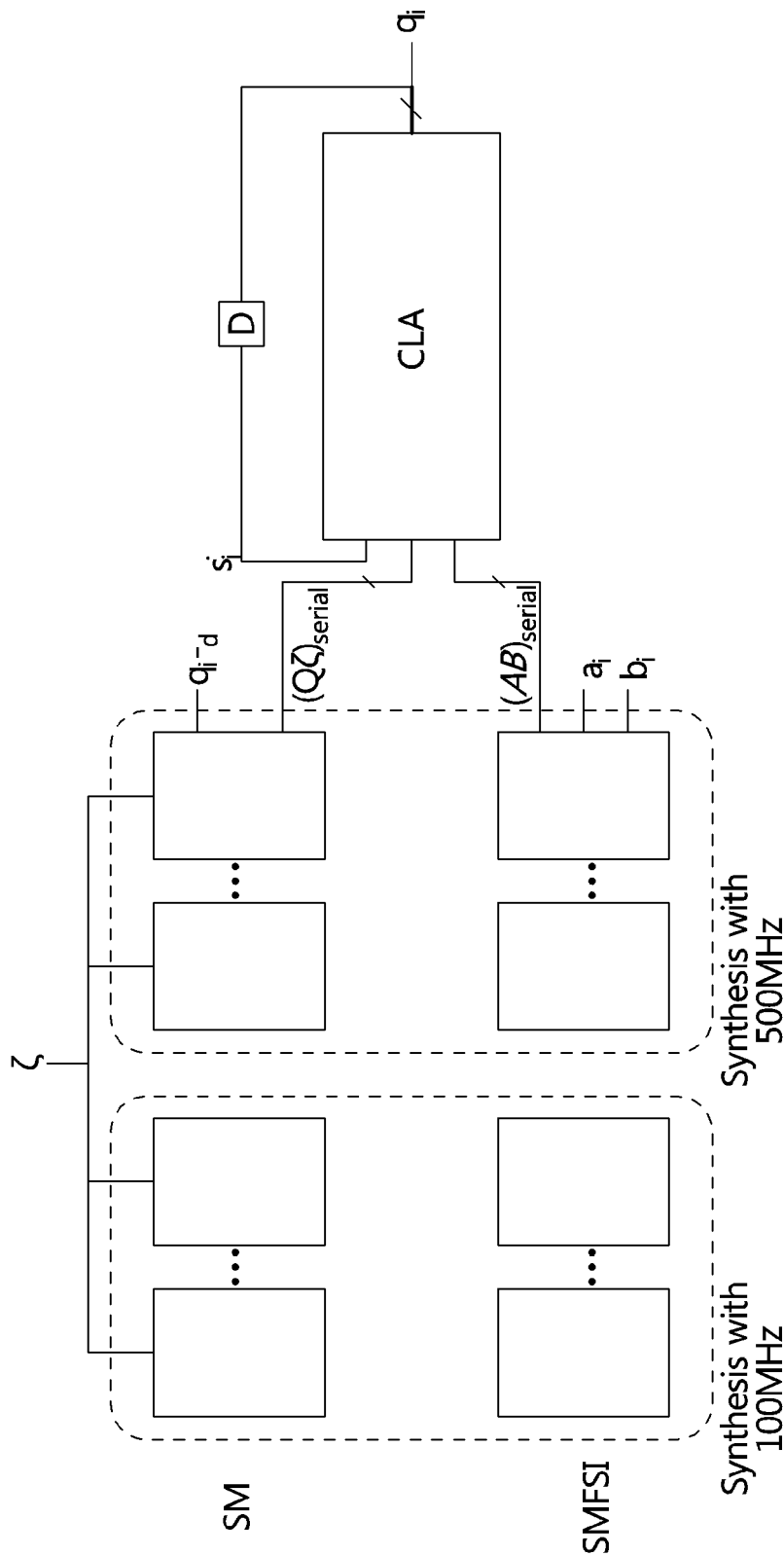
FIG. 16 is a view for explaining the synthesis of a modular multiplication apparatus according to an embodiment of the present invention.

FIG. 16 is a view for explaining the synthesis of a modular multiplication apparatus according to an embodiment of the present invention.

As illustrated in FIG. 16, the modular multiplication apparatus 100 may be synthesized in order to configure a calculator having desired performance for each application.

For example, the modular multiplication apparatus 100 may be implemented such that it operates at 500 MHz when ECC is applied and such that it operates at 100 MHz when RSA is performed. Also, when ECC is applied, power to the synthesized block with 100 MHz is interrupted using a power-gating method, whereby the power consumption of the calculator may be optimized.

When the performance is set to 100 MHz in the synthesis stage, hardware usage may decrease compared to when it is set to 500 MHz, whereby costs may be reduced and low power consumption may be realized.

Hereinafter, the operation method of a modular multiplication apparatus according to an embodiment of the present invention will be described in detail with reference to FIGS. 17 to 24.

Figure 18:
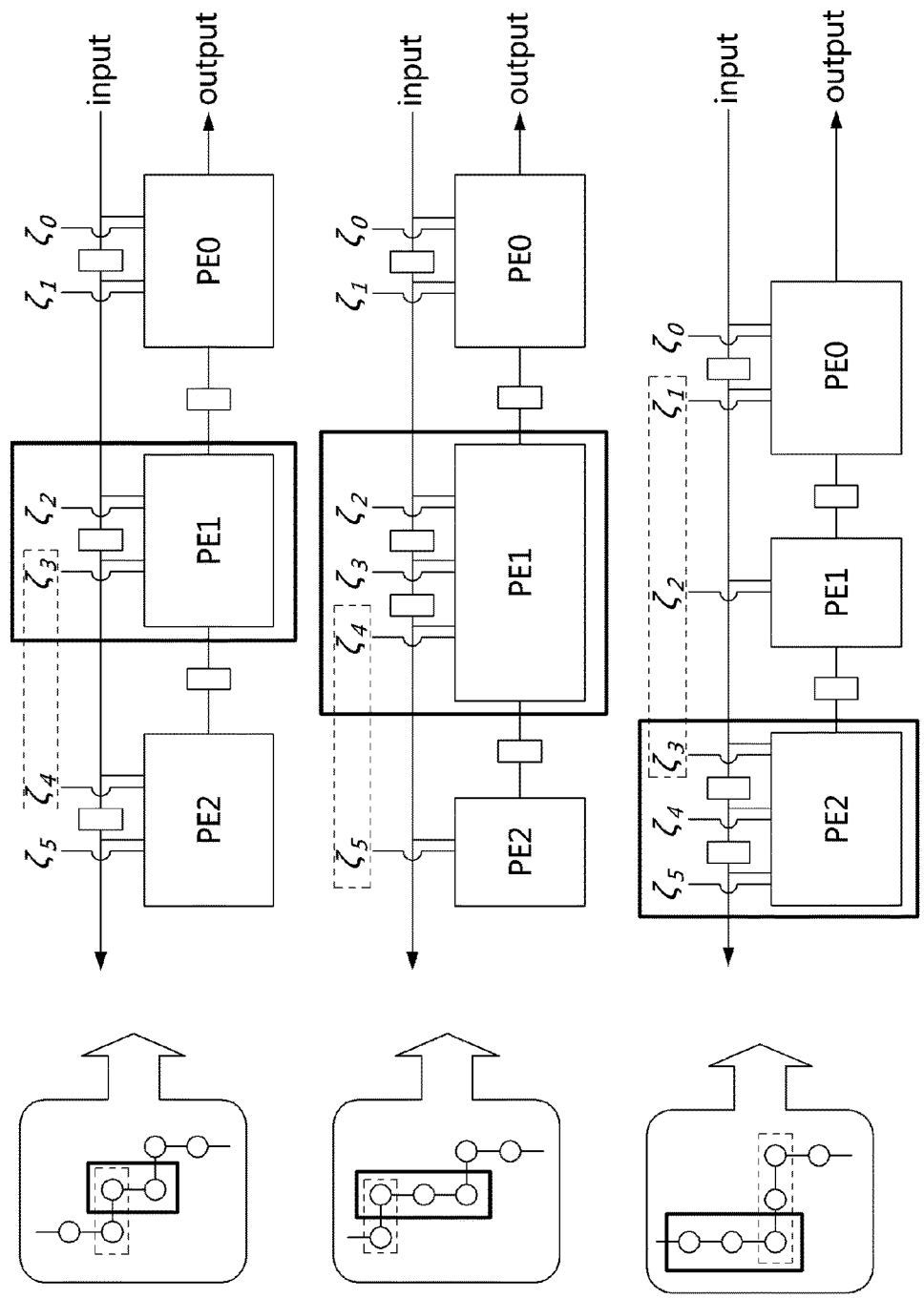
FIG. 18 is a view that shows hardware that configures a serial multiplier for processing PPs scanned in an RPE.

FIGS. 17A to 17C are views for explaining a method for scanning PPs according to an embodiment of the present invention, and FIG. 18 is a view that shows hardware that configures a serial multiplier for processing PPs scanned in RPE.

As shown in FIG. 17, $$(Q\zeta)_{RPE(q_{i-d}\_in)}$$

in FIG. 6 may scan Partial Products (PPs) in order to acquire a Partial Product Sum (PPS). As illustrated in FIG. 17, Repeated Patterned-Enclosures (RPEs) scan all the PPs, and all RPEs corresponding to iteration, the index of which is equal to or less than i, include all the columns, the index of which is equal to or less than i.

The three RPEs illustrated in FIG. 17 correspond to three examples for configuring an RPE.

The example of FIG. 17A represents a serial multiplier in which 2 PPSs are performed in each cell, the example of FIG. 17B represents a serial multiplier in which 3 PPSs are performed in each cell, and the example of FIG. 17C represents a serial multiplier in which 1 PPS and 3 PPSs are performed in each cell.

For the convenience of description, three RPEs have been described, but the example of configuring an RPE is not limited to these examples, and an RPE may be configured in various methods. Also, hardware may be configured as shown in FIG. 18, and hardware for a different type of RPE may also be configured so as to be similar to that shown in FIG. 18.

Figure 19:
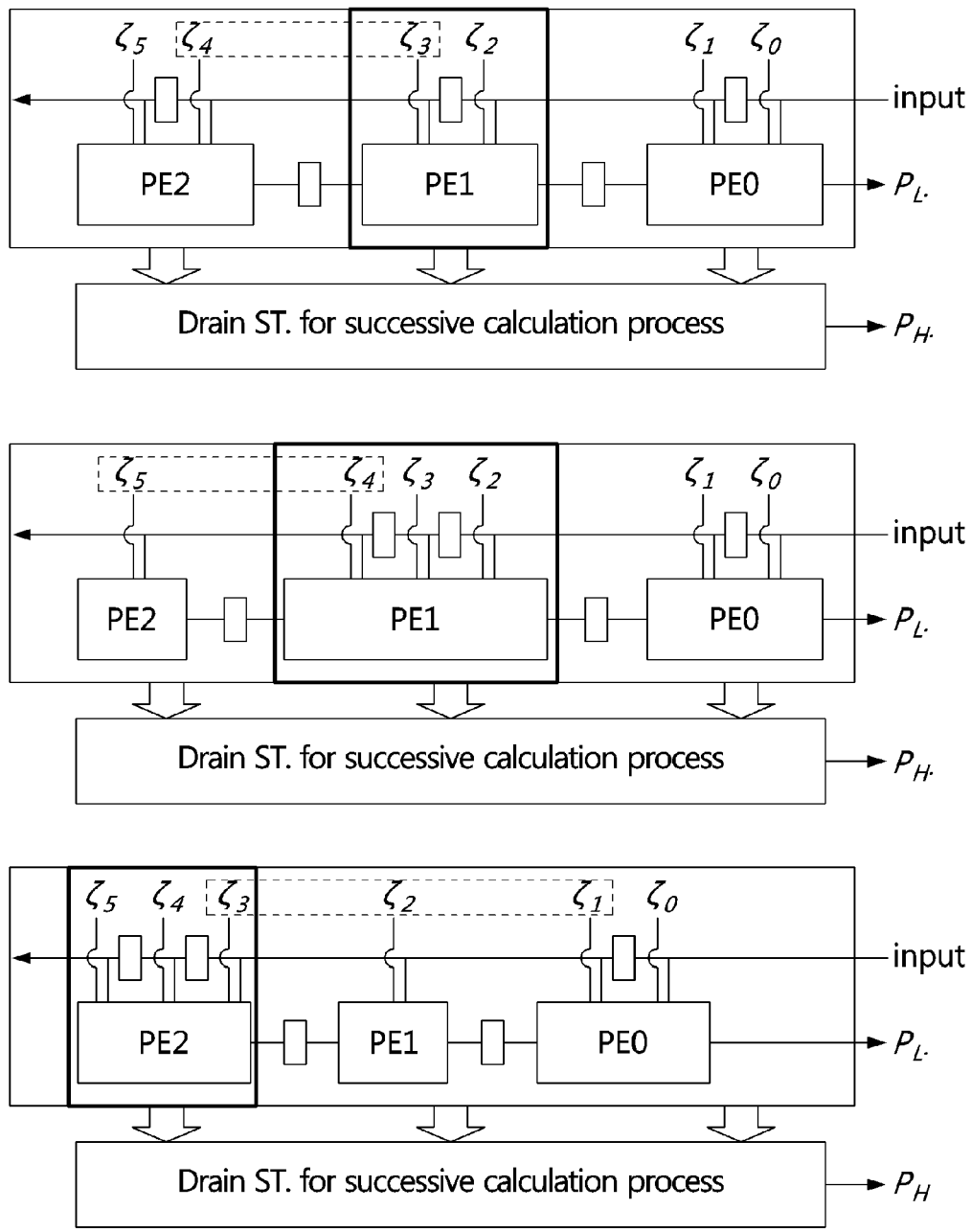
FIG. 19 is a view that shows an example in which a drain structure is applied to the hardware of FIG. 18.
Figure 20:
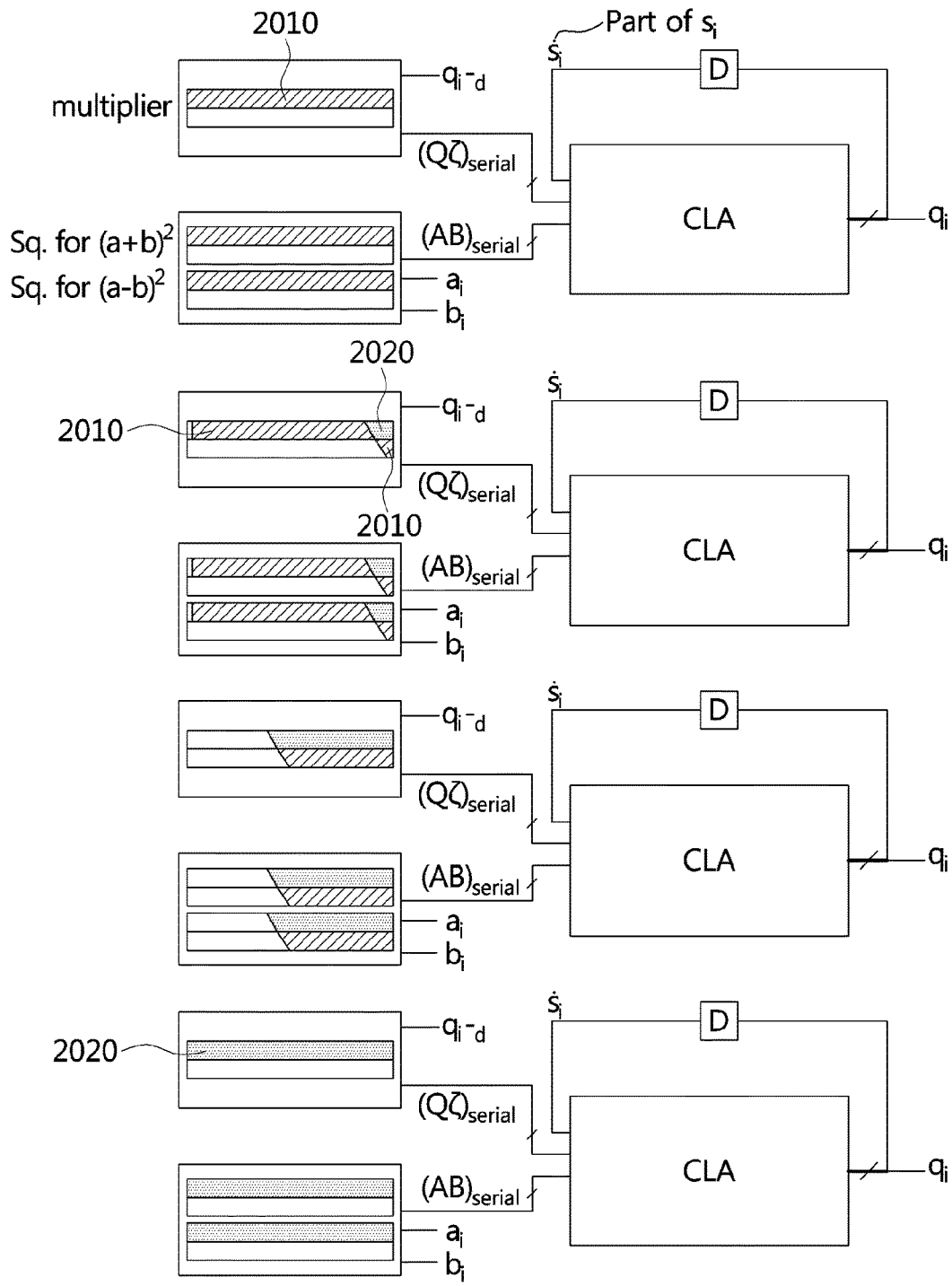
FIG. 20 is a view that shows a data flow when MMM is processed for successive input sets according to an embodiment of the present invention.
Figure 21:
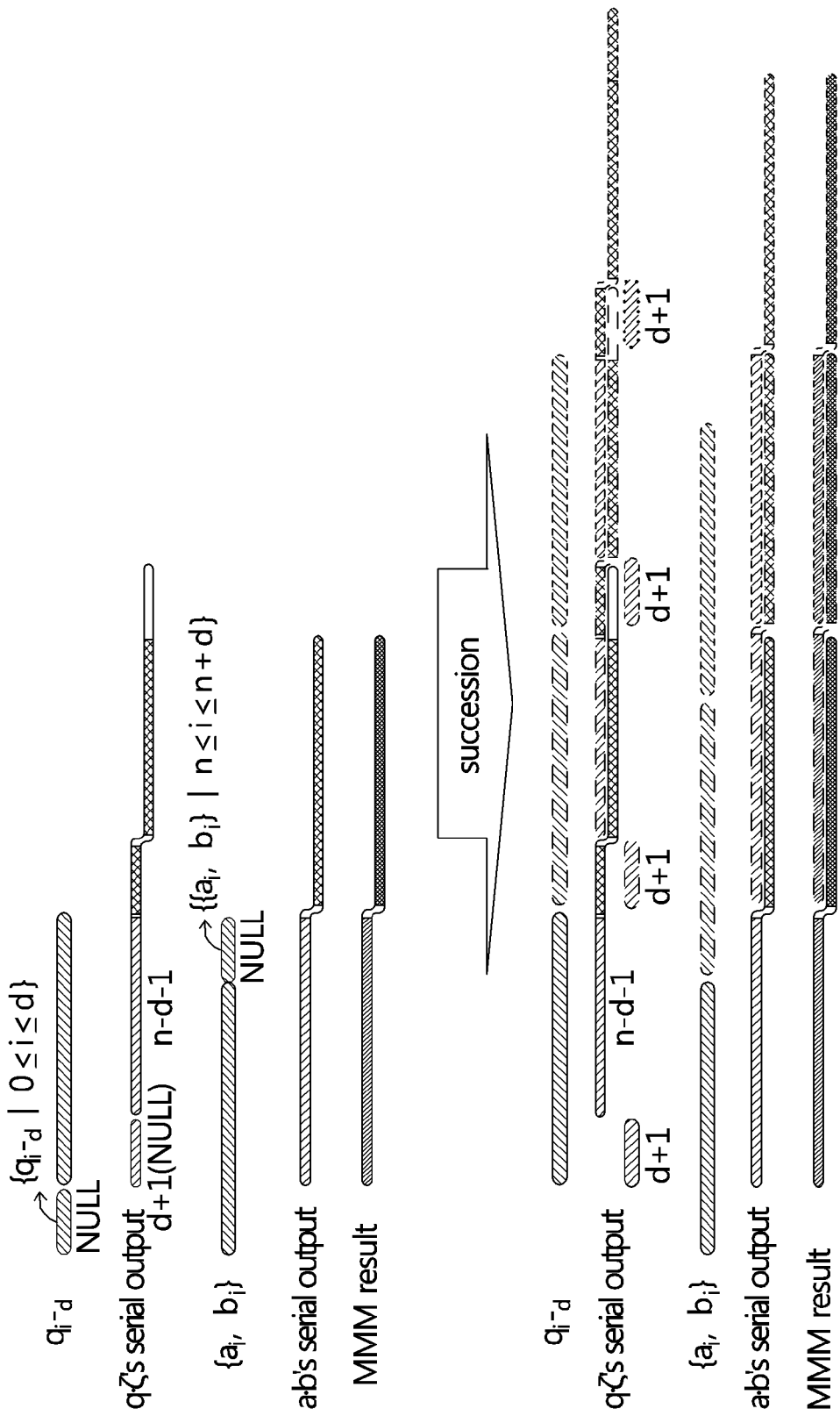
FIG. 21 is a view that shows the output of each module for successive input sets according to an embodiment of the present invention.

FIG. 19 is a view that shows an example in which a drain structure is applied to hardware of FIG. 18, FIG. 20 is a view that shows a data flow when MMM is calculated for consecutive input sets according to an embodiment of the present invention, and FIG. 21 is a view that shows the output of each module for consecutive input sets according to an embodiment of the present invention. In FIG. 19, $P_L$ denotes low-order output, and $P_H$ denotes high-order output.

The structure illustrated in FIG. 18 may improve the efficiency of a calculator by employing a drain method, and the drain method shown in FIG. 19 may configure a data flow for a stream in the form shown in FIG. 20, and may cut the drain logic in half while maintaining its function.

In FIG. 20, an operation result caused by a first input set 2010, which is marked with comb patterns, occupies the interior of a calculator.

When a new input set 2020 is input in the state in which the operation result for the first input set 2010 occupies the interior of the calculator, the interior of the calculator may be occupied by a part marked with dot patterns. The new input set 2020 occupies the place that was occupied by the first input set 2010. Simultaneously, the first input set 2010 is extruded to the drain part below each operation module, and is then output as a High-Order Term (HOT).

Then, the new input set 2020 occupies the whole calculator, and when a new set is input, the above-mentioned processes are repeated. Here, the left part below each operation module is not used. Accordingly, the corresponding part may be removed regardless of the result of the operation.

Also, FIG. 21 shows the input and output of each operation module, and the overall overlapping process is shown in FIG. 21. As illustrated in FIG. 21, $q_{i-d}$ and $\{a_i, b_i\}$ are input.

First, $\{q_{-d}, \ldots, q_0\}$ is input to an SM as NULL, and the result value is output as (d+1) NULLs. Then, the result output as (d+1) NULLS and the result of inputting $\{a_i, b_i\}$ are added and output as the result of the calculator (MMM).

At the outset, the MMM result values as a LOT are input as $q_{i-d}$ and used to calculate Q$\zeta$'s serial output. After calculation is completed by inputting all values of $\{a_i, b_i\}$, because $\{\{a_n, b_n\}, \ldots, \{a_{n+d}, b_{n+d}\}\}$ are input as NULL, it is necessary to decrease the bit size for the result of MMM. Here, the modular multiplication apparatus 100 uses a drain-induced barrier for this purpose, as described above. That is, consecutive overlapping processes may be possible, as shown in the lower part of FIG. 21.

Figure 22:
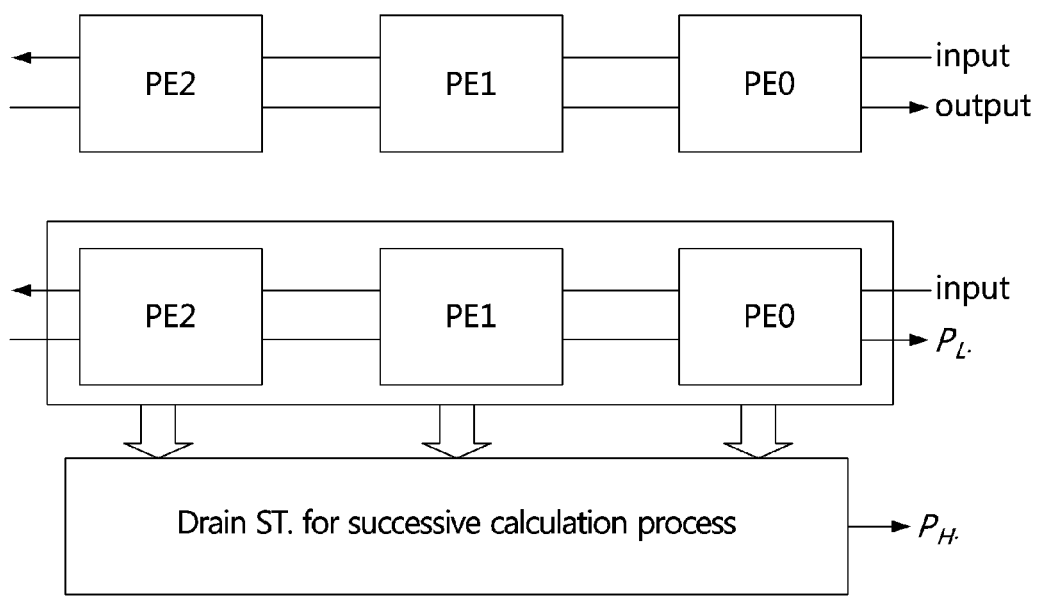
FIG. 22 is a view that shows a serial squarer-based multiplier using a systolic structure according to an embodiment of the present invention.
Figure 23:
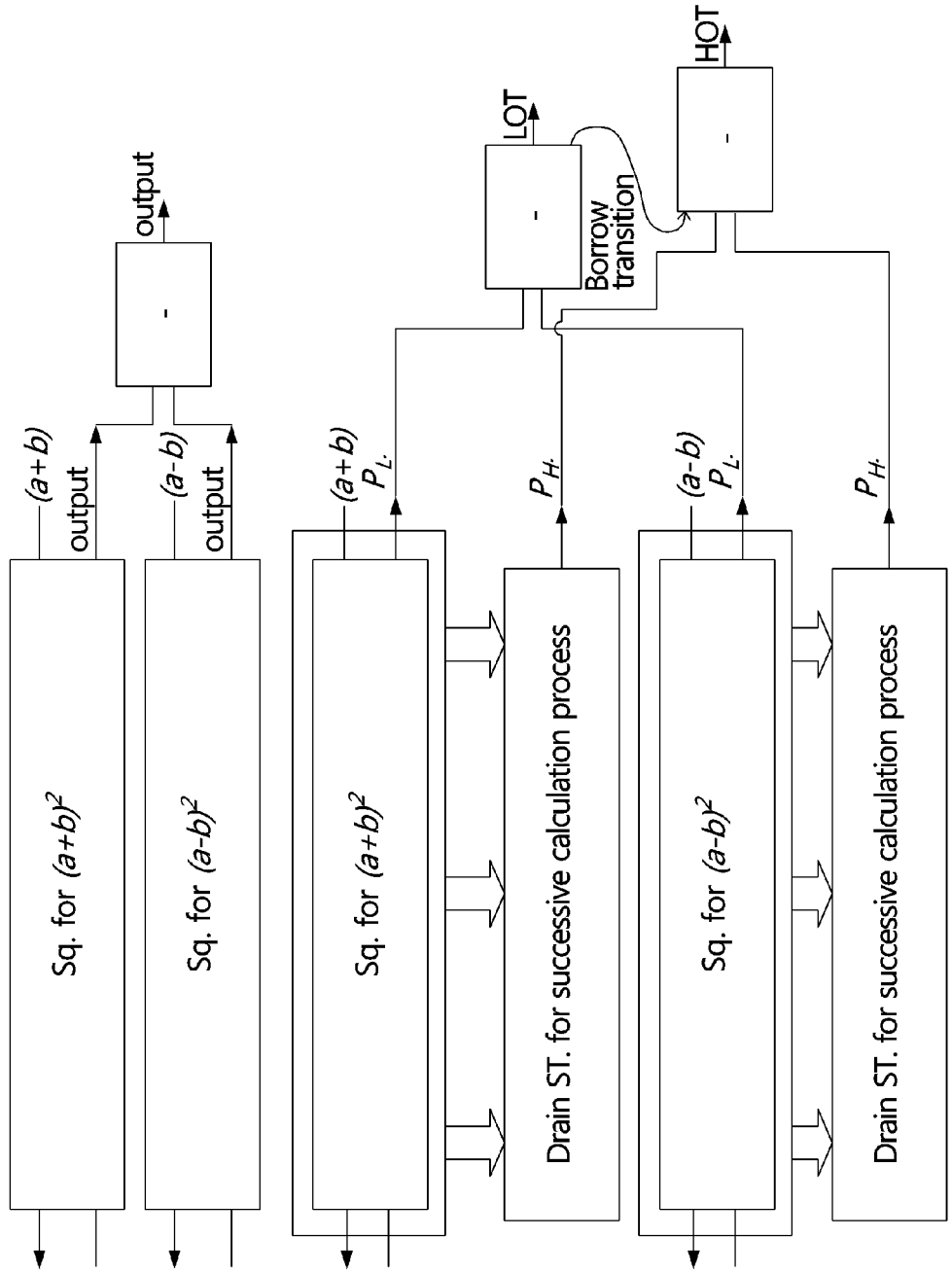
FIG. 23 is a view that shows a full digit serial multiplier configured using a serial squarer-based multiplier according to an embodiment of the present invention.

FIG. 22 is a view that shows a serial squarer-based multiplier based on a systolic structure according to an embodiment of the present invention, FIG. 23 is a view that shows a full digit serial multiplier configured using a serial squarer-based multiplier according to an embodiment of the present invention, and FIG. 24 is a view for explaining the concept of PPS scanning processed in FIG. 23.

As shown in FIG. 22, a serial squarer-based multiplier may be implemented in the form of a systolic array, and a drain structure may be applied thereto, as in the case of a multiplier. Also, the optimization of the drain structure may be applied. Consequently, a full digit serial multiplier may be implemented using the serial squarer-based multipliers as shown in FIG. 23, and conceptually, PPS scanning shown in FIG. 24 may be performed.

For the convenience of description, the serial squarer-based multipliers of FIG. 23 perform PPS scanning as shown in FIG. 24, but PPS scanning performed in practice may not accurately match the example of FIG. 24.

These days, a public key operation is necessarily used to provide cryptographic security, and is being widely used for industrial purposes and consumer goods. Also, with the advent of a hyper-connected society in which drones and various devices are connected with each other, the latency period of calculation becomes more important. However, the conventional implementation method has a structural limitation in which routing and broadcasting structures cannot be eliminated, so that it is difficult to improve performance. Also, as the semiconductor process becomes microscopic, existing problems related to implementation are exacerbated.

In contrast, the modular multiplication apparatus according to an embodiment of the present invention may be effectively used in hyper-connected society by solving the existing problems and enabling various configurations.

According to the present invention, it is possible to solve an idle-time problem and a problem resulting from a broadcast structure, which occur in the case of use of a prime-field arithmetic unit in the form of a systolic array.

Also, according to the present invention, a performance degradation problem may be solved by immediately providing the current result to the next stage as input.

Also, according to the present invention, an operation on a great number of bits may be performed by solving problems related to routing and broadcasting.

Also, according to the present invention, a modular multiplication apparatus, in which modularization and systolization are possible, may be provided.

Also, according to the present invention, performance, application coverage, a size, a restriction on power consumption, and the like may be freely set depending on a user-desired form.

As described above, the apparatus and method for modular multiplication according to the present invention are not limitedly applied to the configurations and operations of the above-described embodiments, but all or some of the embodiments may be selectively combined and configured, so that the embodiments may be modified in various ways.

What is claimed is:

1. An apparatus for modular multiplication, comprising:
   a first operation unit for performing a first operation based on a structure of at least one of a serial multiplier, which scans all partial products, and a serial squarer-based multiplier, which calculates a difference between a square of a sum of input values and a square of a difference of the input values;
   a second operation unit for performing a second operation based on a structure of at least one of the serial multiplier and the serial squarer-based multiplier; and
   an adder unit for outputting a result of adding a result of the first operation and a result of the second operation, feeding an intermediate value stream back to the first operation unit, which calculates a product of the intermediate value stream and a zeta parameter, and outputting a High-Order Term as a result of Montgomery modular multiplication,
   wherein the first operation unit and the second operation unit are configured to have a systolic structure, to respectively output the result of the first operation and the result of the second operation in digit-serial format, and to output the result of the first operation and the result of the second operation in order from a least significant digit to a most significant digit.

2. The apparatus of claim 1, wherein at least one of the first operation unit and the second operation unit processes consecutive input sets based on a drain structure.

3. The apparatus of claim 2, wherein:
   the first operation unit performs the first operation based on the serial multiplier;
   the second operation unit performs the second operation based on the two serial squarer-based multipliers;
   the first operation unit receives a secondary input value after input of a primary input value starts; and
   the second operation unit simultaneously receives the primary input value and the secondary input value.

4. The apparatus of claim 2, wherein the first operation unit and the second operation unit respectively perform the first operation and the second operation based on the two serial squarer-based multipliers and simultaneously receive a primary input value and a secondary input value.

5. The apparatus of claim 1, wherein the first operation unit and the second operation unit respectively perform the first operation and the second operation based on the serial multiplier and receive a secondary input value after input of a primary input value starts.

6. The apparatus of claim 5, wherein, among cells of the first operation unit and cells of the second operation unit, cells that process a same degree are processed after being merged.

7. A method for modular multiplication, performed by an apparatus for modular multiplication, comprising:
   performing, by a first operation unit having a systolic structure, a first operation based on a structure of at least one of a serial multiplier, which scans all partial products, and a serial squarer-based multiplier, which calculates a difference between a square of a sum of input values and a square of a difference of the input values, and outputting, by the first operation unit, a result of the first operation in digit-serial format in order from a least significant digit to a most significant digit;

performing, by a second operation unit having a systolic structure, a second operation based on a structure of at least one of the serial multiplier and the serial squarer-based multiplier, and outputting, by the second operation unit, a result of the second operation in digit-serial format in order from a least significant digit to a most significant digit;

outputting a result of adding the result of the first operation and the result of the second operation;

feeding an intermediate value stream back to the first operation unit, which is configured to calculate a product of the intermediate value stream and a zeta parameter; and outputting a High-Order Term as a result of Montgomery modular multiplication.

8. The method of claim 7, wherein at least one of performing the first operation and performing the second operation is configured to process consecutive input sets based on a drain structure.

9. The method of claim 8, wherein:
performing the first operation is configured to perform the first operation based on the serial multiplier by receiving a secondary input value after input of a primary input value starts; and
performing the second operation is configured to perform the second operation based on the two serial squarer-based multipliers by simultaneously receiving the primary input value and the secondary input value.

10. The method of claim 9, wherein performing the first operation and performing the second operation are configured to:
respectively perform the first operation and the second operation based on the serial multiplier; and
receive a secondary input value after input of a primary input value starts.

11. The method of claim 10, wherein, among cells of the first operation unit and cells of the second operation unit, cells that process a same degree are processed after being merged.

12. The method of claim 8, wherein performing the first operation and performing the second operation are configured to:
respectively perform the first operation and the second operation based on the two serial squarer-based multipliers; and
simultaneously receive a primary input value and a secondary input value.

* * * * *